United States Patent [19]

Schultz

[11] Patent Number: 5,721,902
[45] Date of Patent: Feb. 24, 1998

[54] RESTRICTED EXPANSION OF QUERY TERMS USING PART OF SPEECH TAGGING

[75] Inventor: John Michael Schultz, Bala Cynwyd, Pa.

[73] Assignee: Infonautics Corporation, Wayne, Pa.

[21] Appl. No.: 528,740

[22] Filed: Sep. 15, 1995

[51] Int. Cl.$^6$ .................................................. G06F 17/30
[52] U.S. Cl. .................... 395/604; 364/419; 364/419.08; 364/222.01; 364/225; 364/225.3; 364/225.4
[58] Field of Search .................... 364/19.08, 419, 364/419.08, 222.01, 225.3, 225.4, 225; 395/600, 605, 604

[56] References Cited

U.S. PATENT DOCUMENTS

| | | | |
|---|---|---|---|
| 4,849,898 | 7/1989 | Adi | 364/419 |
| 4,868,733 | 9/1989 | Fujisawa et al. | 364/200 |
| 5,099,426 | 3/1992 | Cargren et al. | 364/419 |
| 5,146,405 | 9/1992 | Church | 364/419 |
| 5,241,671 | 8/1993 | Reed et al. | 395/610 |
| 5,265,065 | 11/1993 | Turtle | 395/600 |
| 5,297,039 | 3/1994 | Kanaegami et al. | 364/419.08 |
| 5,331,556 | 7/1994 | Black et al. | 364/419.08 |
| 5,477,448 | 12/1995 | Golding et al. | 364/419.08 |
| 5,485,372 | 1/1996 | Golding et al. | 364/419.08 |
| 5,544,049 | 8/1996 | Henderson et al. | 364/419.19 |

FOREIGN PATENT DOCUMENTS

| | | |
|---|---|---|
| 624837 | 12/1989 | Australia . |
| 648113 | 11/1992 | Australia . |
| 4213393 | 10/1993 | Australia . |
| 9427227 | 11/1994 | WIPO . |
| 9427237 | 11/1994 | WIPO . |
| 9500896 | 1/1995 | WIPO . |
| 9512172 | 5/1995 | WIPO . |
| 9513582 | 5/1995 | WIPO . |
| 9513585 | 5/1995 | WIPO . |
| 9514279 | 5/1995 | WIPO . |
| 9514280 | 5/1995 | WIPO . |
| 9518406 | 7/1995 | WIPO . |

*Primary Examiner*—Thomas G. Black
*Assistant Examiner*—Jean M. Corriélus
*Attorney, Agent, or Firm*—Reed Smith Shaw & McClay

[57] ABSTRACT

A method for searching a database of an information retrieval system in response to a query having at least one query word with a part of speech, for applying the query word to the database and selecting information from the database according to the query word. A semantic network is provided for determining expansion words to expand the search of the database in response to said the query word. The part of speech of the selected query word is determined. The selected query word is applied to the semantic network to provide a query expansion word in response to the selected query word. The part of speech of the query expansion word is determined. The query expansion word is applied to the database in accordance with the part of speech of the selected query word and the part of speech of the query expansion word.

4 Claims, 22 Drawing Sheets

| # | ws 0 | ws 1 | ws 2 | ws 3 | ws 4 | ws 5 | ws 6 | ws 7 | ws 8 | ws 9 |
|---|------|------|------|------|------|------|------|------|------|------|
| 1 | 100 100 | 60 60 | | | | | | | | |
| 2 | 100 90 | 75 70 | 60 60 | | | | | | | |
| 3 | 100 90 | 89 75 | 74 70 | 60 60 | | | | | | |
| 4 | 100 90 | 89 80 | 79 75 | 74 70 | 60 60 | | | | | |
| 5 | 100 90 | 89 80 | 79 75 | 79 75 | 69 65 | 60 60 | | | | |
| 6 | 100 90 | 89 85 | 84 80 | 79 75 | 74 70 | 69 67 | 60 60 | | | |
| 7 | 100 90 | 89 85 | 84 80 | 79 75 | 74 70 | 69 67 | 66 63 | 60 60 | | |
| 8 | 100 90 | 89 90 | 89 80 | 79 75 | 74 70 | 69 69 | 66 64 | 63 62 | 60 60 | |
| 9 | 100 95 | 94 90 | 89 80 | 79 75 | 74 70 | 69 69 | 66 66 | 63 63 | 66 63 | 60 60 |
| 10 | 100 95 | 94 90 | 89 85 | 84 80 | 79 77 | 76 74 | 73 72 | 69 67 | 66 63 | 60 60 |

| NUMBER OF QUERY WORDS | 100 | 90 | 80 | 70 | 60 | 50 | 40 | 30 | 20 | 10 | 1 |
|---|---|---|---|---|---|---|---|---|---|---|---|
| 1 | | | | | | | | | | | |
| 2 | | 0000000000 — 804a | | | | | | | | | |
| 3 | 00000000000000 | | | — 804a | | | | | | | |
| 4 | 000000000000000000 | | | 1111111111111111 | | | | | | | |
| 5 | 00000000000000000000 | | | 11111111111111111111 | | | 222222222222 | 333333 | | | |
| 6 | 000000000000000000 | | | 1111111111111111 | | | 2222222222 | 33333333 | | | |
| 7 | 0000000000000000 | | | 11111111111111 | | | 2222222222 | 333333333 | 444444 | | |
| 8 | 0000000000000000 | | 111111111111 | | 804b — 111111 | | 22222222 | 3333333 | 444444 | 5 | |
| 9 | 000000000000 | | 1111111111 | | | 1 804b | 22222222 | 333333 | 44444 | | 6 |
| 10 | 0000000000 | | 11111111 | | | 22222222 — 804c | 55555 | 4444444 | 555 | 7 | |
| | | | | | | | 6666 | 555 | 66 | 8 | |
| | | | | | | | 6666 | 777 | 777 | 88 | 9 |

RESTRICTED EXPANSION OF QUERY TERMS USING PART OF SPEECH TAGGING

FIELD OF THE INVENTION

The present invention is directed to systems for identifying documents corresponding to a search topic or query. More particularly, the present invention is directed to an automated multi-user system for identifying and retrieving text and multi-media files related to a search topic from a database library composed of information from many various publisher sources.

BACKGROUND OF THE INVENTION

Information retrieval systems are designed to store and retrieve information provided by publishers covering different subjects. Both static information, such as works of literature and reference books, and dynamic information, such as newspapers and periodicals, are stored in these systems. Information retrieval engines are provided within prior art information retrieval systems in order to receive search queries from users and perform searches through the stored information. It is an object of most information retrieval systems to provide the user with all stored information relevant to the query. However, many existing searching/retrieval systems are not adapted to identify the best or most relevant information yielded by the query search. Such systems typically return query results to the user in such a way that the user must retrieve and view every document returned by the query in order to determine which document(s) is/are most relevant. It is therefore desirable to have a document searching system which not only returns a list of relevant information to the user based on a query search, but also returns the list to the user in such a form that the user can readily identify which information returned from the search is most relevant to the query topic.

Existing systems for searching and retrieving files from databases based on user queries are directed primarily to the searching and retrieval of textual documents. However, there is a growing volume of multi, media information being published which is not textual Such multi-media information corresponds, for example, to still images, motion video sequences and digital audio sequences, which may be stored and retrieved by digital computers. It would be desirable from the point of view of an individual using an information searching/retrieval system to be able to be able to query a library or database and identify not only text documents, but also multi-media files that are relevant to user's query. Moreover, it would be desirable if the searching system could return to the user not only a single list having both text and multi-media information relevant to the query search, but also a list which enabled the user to readily identify which of the text and multi-media fries were most relevant to the query topic.

Each different publisher providing documents that may be retrieved by information retrieval systems typically uses its own information format to store and transmit its information files. Thus, an information searching/retrieval system which has a library database based upon information from many various publishers must be compatible with many different publisher formats. This compatibility requirement can serve to slow the performance of an information searching/retrieval system.

It is well known in the prior art of information retrieval systems to permit a user to specify a single subject of a number of subjects for searching. For example, a user may wish to search only sports literature, medical literature or art literature. This avoids unnecessary searching through database documents that are not relevant to the subject of interest to the user. In order to provide this capability, information retrieval systems must categorize documents received from publishers according to their subject prior to adding them to the database. Subjecting of incoming documents often requires an individual to read each incoming and make a determination regarding its subject. This process is very time consuming and expensive, as there is often a large number of incoming documents to be processed. The subjecting process may be further complicated if certain documents should properly be categorized in more than one subject. It would be desirable to have an automated system for processing incoming documents which categorized each incoming document into one or more subjects, and which did not require an individual to read each incoming document and make a separate judgment categorizing the subject of such document.

When a user of an information searching/retrieval system enters a search query into the system, the query must be parsed. Based on the parsed query, a listing of stored documents relevant to the query is provided to the user for review. In the prior art, it is known to use semantic networks when parsing a query. Semantic networks make it possible to identify words not appearing in the query, but which correspond to or are associated with the words used in the query. The number of words used to search the database is then expanded by including the corresponding words or associated words identified by the semantic network in the search instructions. This procedure is used to increase the number of relevant documents located by the information searching/retrieval system. Although semantic networks may be useful for finding additional relevant documents responsive to a query, it is believed that use of such networks also tends to increase the number of irrelevant documents located by the search. In fact, it is generally believed that the number of additional relevant documents identified through the use of semantic networks is roughly equal to the number of irrelevant documents which are also brought into the search results list as a result of the semantic network. It would be desirable to have a system for implementing a semantic network which maximized the number of relevant documents identified during the search, without substantially increasing the number of irrelevant documents found by the search.

Many publishers that provide documents to information retrieval systems require record-keeping in order to ensure accurate royalty payments. Record-keeping permits the publishers to determine the interest level in various documents produced by the publisher, and the demographics of users retrieving such documents. Thus, it would be desirable to have a searching/retrieval system that tracked not only how often each document stored in the system database was retrieved by users, but also the demographics of the users retrieving the documents and the query searches used to identify and retrieve such documents.

It is therefore an object of the present invention to provide a searching/retrieval system which can query a library or database and identify not only text documents, but also multi-media files stored on the library or database that are relevant to query.

It is a further object of the present invention to provide a searching/retrieval system that accepts a query and returns a single search results list having both text and multi-media information, which list is presented in a format that enables the user to readily identify which of the text and multi-media files are most relevant to the query topic.

It is a still further object of the present invention to provide a scalable computer architecture for implementing a searching/retrieval system which can query a database and identify text documents and multi-media files stored on the database that are relevant to query.

It is a still further object of the present invention to provide an information searching/retrieval system which has a library database based upon information from many various publishers, and which is compatible with many different publisher formats.

It is a still further object of the present invention to provide an information searching/retrieval system which has a library database based upon information from many various publishers, and wherein such information is stored in a central database in one or more common information formats.

It is a still further object of the present invention to provide an automated system for processing incoming documents to be stored on a library or database, which system categorizes each incoming document into one or more subjects, and which does not require an individual to read each incoming document and make a separate judgment categorizing the subject of such document.

It is a still further object of the present invention to provide a system for implementing a semantic network which maximizes the number of relevant documents identified during the query search, without substantially increasing the number of irrelevant documents found by the search.

It is a still further object of the present invention to provide a system for using a semantic network which maximizes the number of relevant documents identified during a query search by semantically expanding the search in response to the part of speech associated with each query term in the search.

It is a still further object of the present invention to provide a searching system that queries a database to determine text documents and multi-media files relevant to the query, wherein weightings associated with proper nouns and slow words are adjusted prior to searching the database.

It is a further object of the present invention to provide a searching/retrieval system that accepts a query and returns a single search results list including document relevance values, wherein the document relevance values are independent of the number of terms in the query.

It is yet a still further object of the present invention to provide a searching/retrieval system that tracks not only how often each document stored in the system database was retrieved by users, but also the demographics of the users retrieving the documents and the query searches used to identify and retrieve such documents.

These and other objects and advantages of the invention will become more fully apparent from the description and claims which follow or may be learned by the practice of the invention.

SUMMARY OF THE INVENTION

The present invention is directed to a method and apparatus for identifying textual documents and multi-media files corresponding to a search topic. A plurality of document records, each of which is representative of at least one textual document, are stored, and a plurality of multi-media records, each of which is representative of at least one of multi-media file, are also stored. The document records have text information fields associated therewith, each of the text information fields representing text from one of the plurality of textual documents. The multi-media records have multi-media information fields for representing only digital video (i.e., still images or motion video image sequences), digital audio or graphics information, and associated text fields, each of the associated text fields representing text associated with one of the multi-media information fields. A single search query corresponding to the search topic is received. The single search query is preferably in a natural language format. An index database is searched in accordance with the single search query to simultaneously identify document records and multi-media records related to the single search query. The index database has a plurality of search terms corresponding to terms represented by the text information fields and the associated text fields. The index database also includes a table for associating each of the document and multi-media records with one or more of the search terms. A search result list having entries representative of both textual documents and multi-media files related to the single search query is generated in accordance with the document records and the multi-media records identified by the index database search. Text corresponding to the search topic is retrieved by selecting entries from the search result list representing document records to be retrieved, and then retrieving text represented by the text information fields associated with the selected document records. Digital video, audio or graphics information corresponding to the search topic is retrieved by selecting entries from the search result list representing selected multi-media records to be retrieved, and then retrieving digital video, audio or graphics information represented by multi-media information fields associated with the selected multi-media records.

In accordance with a further aspect, the present invention is directed to a computer-implemented method and apparatus for composing a composite document on a selected topic from a plurality of information sources by searching the plurality of information sources and identifying, displaying and copying files corresponding to the selected topic. A plurality of records, each of which is representative of at least one information file, are stored in a database. A single search query corresponding to the search topic is received. The database is searched in accordance with the single search query to identify records related to the single search query. A search result list is then generated having entries representative of information files identified during the database search, and the search result list is displayed in a first display window open on a user display. Signals representative of at least first and second selected entries from the search result list are received from the user, the first and second selected entries respectively corresponding to first and second information files. A second display window for displaying at least a portion of the first information file is opened on the user display, a third display window for displaying at least a potion of the second information file is opened on the user display, and a document composition window for receiving portions of the first and second first information files is opened on the user display. The composite document is then composed by copying portions of the first and second information files from the second and third display windows, respectively, to the document composition window.

In accordance with a still further aspect, the present invention is directed to a split-server architecture for processing a search query provided by a user, and identifying and retrieving documents from a database corresponding to the search query. A session server is provided for receiving the search query from the user. The session server has at least a first processor coupled to the user over a communications channel. A query server is coupled to the session server. The query server has at least a second processor coupled to a first database having records representative of the documents to be searched. The query server includes means for receiving the search query from the session server, searching means for searching the first database to identify documents responsive to the search query, and means for sending search results information representative of the documents identified by the searching means from the query server to the session server. The session server includes means for sending the search query to the query server, means for receiving the search results information from the query server, means for sending a search results list representative of the search results information across the communications channel to the user, means for receiving a document retrieval request transmitted from the user over the communications channel, means for retrieving a document in response to the retrieval request and transmitting a file representative of the document to the user over the communications channel, and means for incrementing an accounting record on an accounting database coupled to the session server, the accounting record representing a number of retrievals of the document by the session server.

In accordance with a still further aspect, the present invention is directed to a method for preparing input information having differing input formats from different information sources for storage in an information retrieval system having a database with a database index for retrieval of the input information from the database. First and second input information having differing input information formats are received. The input information in one format is converted from the input format to an information retrieval system format to provide reformatted information. The information from the other information format is converted into the information retrieval system format to provide further reformatted information, whereby the input information in the differing input formats is converted into a single information retrieval system format. The reformatted information is stored in the database according to the single information system retrieval format and retrieved from the database according to the single information retrieval system format.

In accordance with a still further aspect, the present invention is directed to a method for determining a part of speech of words in a sentence or sentence fragment. A hidden Markov model for determining the most likely part of speech for the words in the sentence or sentence fragment is provided, wherein the hidden Markov model has an initial transition matrix and a subsequent transition matrix for storing the probabilities of transitions from one part of speech to another. The initial matrix of the hidden Markov model is effectively removed by making the probabilities therein equal to each other to provide a modified hidden Markov model. The modified hidden Markov model is applied to the sequence of words to determine the most likely part of speech of words within a sentence fragment with increased accuracy.

In accordance with yet a further aspect, the present invention is directed to a method for storing input information in an information retrieval system database wherein a plurality of information subject categories are provided. A plurality of subject lexicons are provided, each subject lexicon of the plurality of subject lexicons corresponding to an information subject category of the plurality of information subject categories. Each subject lexicon contains information representative of its corresponding information subject category. The input information is compared with the subject lexicons and the input information is stored in a selected information subject category according to the comparing of the input information with the subject lexicons.

In accordance with yet a further aspect, the present invention is directed to a method for storing information in an information retrieval system having a database for retrieval of the input information in response to a query. Text information representative of text is received for storing in the system. Image information representative of an image is also received for storing in the system. Additionally, image text information representative of text associated with the image information is received. The image information is stored in an image information format. The text information and the image text information are stored in a common text information format whereby the format of the stored text information is identical to the form of the stored image text information. The text information and image text information are searched in the common text information format and the text information and image text information are identified in response to a single query. The image information associated with the retrieved image text information is selected and the selected image information is retrieved whereby the text information and the image information are retrieved in accordance with the same query.

In accordance with still yet a further aspect, the present invention is directed to a method for searching a database of an information retrieval system in response to a query having at least one query word with a part of speech, for applying the query word to the database and selecting information from the database according to the query word. A semantic network is provided for determining expansion words to expand the search of the database in response to the query word. The part of speech of the selected query word is determined. The selected query word is applied to the semantic network to provide one or more query expansion words in response to the selected query word. The part of speech of the query expansion word is determined. The query expansion word is applied to the database in accordance with the part of speech of the selected query word and the part of speech of the query expansion word.

In accordance with a still further aspect, the present invention is directed to a method for performing a search of a database in an information retrieval system in response to a query having at least one query word with a query word weight and for applying the query word to the database and selecting information from the information retrieval system in accordance with the query word. A query word is selected and assigned a weight. The weight is adjusted depending on whether the query word is a proper noun or slow word. The adjusting can be an increase or a decrease in the weight. Information is selected from the information retrieval system in accordance with the adjusted weight.

In accordance with a still further aspect, the present invention is directed to a method for searching a database of an information retrieval system in response to a query having a query length of at least one word, for applying the query word to the database and selecting information from the database according to the query word. The query is received and the length of the query is determined. Information is selected from the database according to the query. The relevance of the selected information is determined according to matches between the query and the information. The determined relevance of the selected information is adjusted according to the length of the query.

In accordance with a further aspect, the present invention is directed to a method for searching art information retrieval system having a database containing a plurality of documents from a plurality of document sources in response to a query from a user. A document log table is provided for tabulating document information of documents selected by the user in response to a query from the user. The query is received from the user and a document is selected by the user in response to the received query. The document log table is adjusted in response to the selecting of the document. The adjusted log table can be used to determine royalties.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

FIG. 8A is a table of relevance normalization values for normalizing relevance scores output by a search engine, in accordance with a preferred embodiment of the present invention.

FIG. 8B is a graph illustrating a system for normalizing relevance scores output by a search engine, in accordance with a preferred embodiment of the present invention.

DETAILED DESCRIPTION OF THE INVENTION

Figure 1:
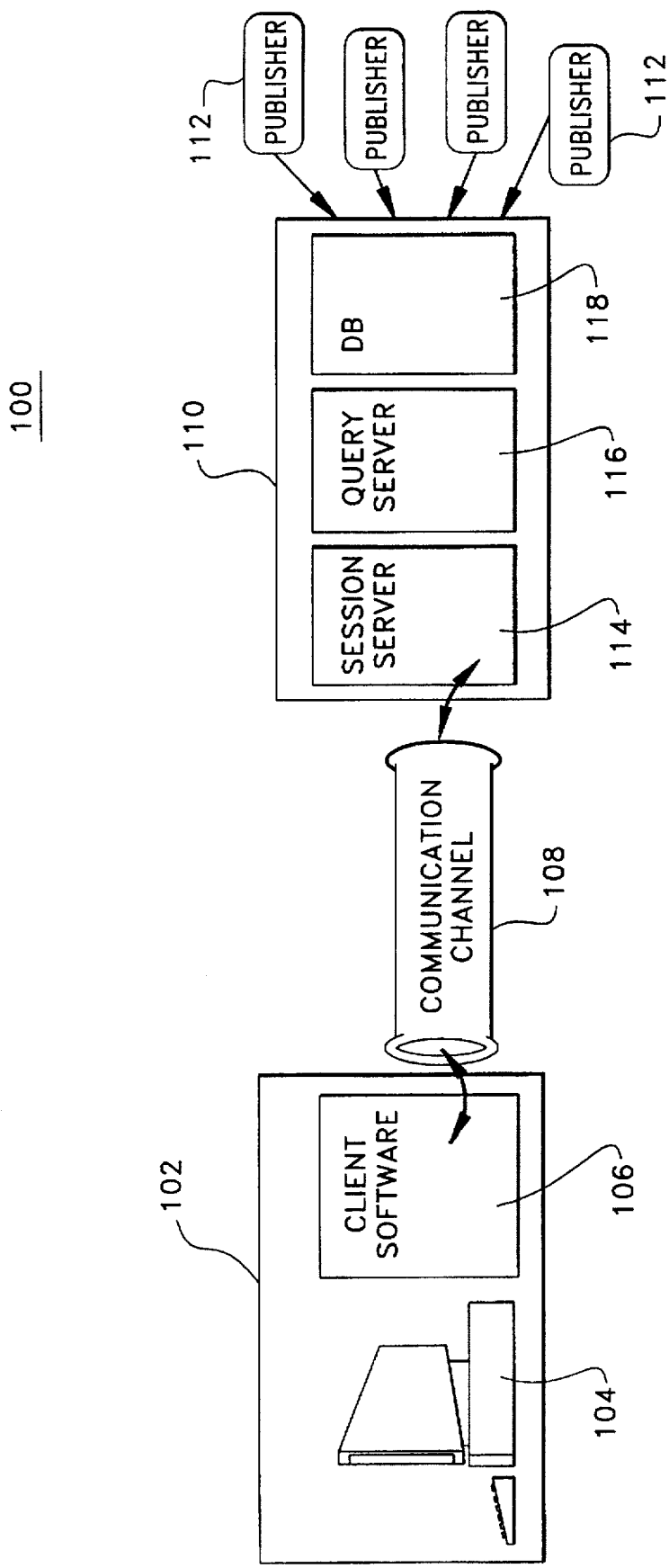
FIG. 1 is a simplified block diagram showing an information retrieval system in accordance with a preferred embodiment of the present invention.

Referring now to FIG. 1, there is shown a simplified block diagram illustrating an information retrieval system 100, in accordance with a preferred embodiment of the present invention. The information retrieval system 100 includes a user station 102 for searching information files which have been collected from various publisher sources 112 and stored in data center 110. The user station 102 includes a personal computer (PC) 104 and user software 106 which resides on PC 104. User software 106 includes a graphical user interface (shown generally in FIGS. 4A, 4B and 4C). The user station 102 provides search queries by way of a communications channel 108 (such as, for example, a large volume public network or the Internet) coupled to the data center 110. The data center 110 includes session server 114 which includes means for receiving a search query from user station 102, means for sending the search query to a query server 116, means for receiving search results information from the query server 116, means for sending a search results list representative of the search results information across communications channel 108 to the user station 102, means for receiving a document retrieval request transmitted from user station 102 over communications channel 108 to session server 114, and means for retrieving a document from database 118 in response to the retrieval request and transmitting a file representative of the document to user station 102 over communications channel 108. The query server 116 at data center 110 includes means for receiving a search query from the session server 114, searching means for searching a document index database 117 (shown in FIG. 3) to identify documents responsive to the search query, and means for sending search results information representative of the documents identified by the searching means from the query server 116 to the session server 114. Data center 110 also includes a library database 118 for storing text, image, audio or other multi-media information representative of files provided by a plurality of publishers 112. As explained more fully below, session server 114 retrieves (from library 118) documents identified by a search query and selected by a user of user station 102 for retrieval, and then transmits the selected documents to the user station 102 over channel 108.

Figure 2:
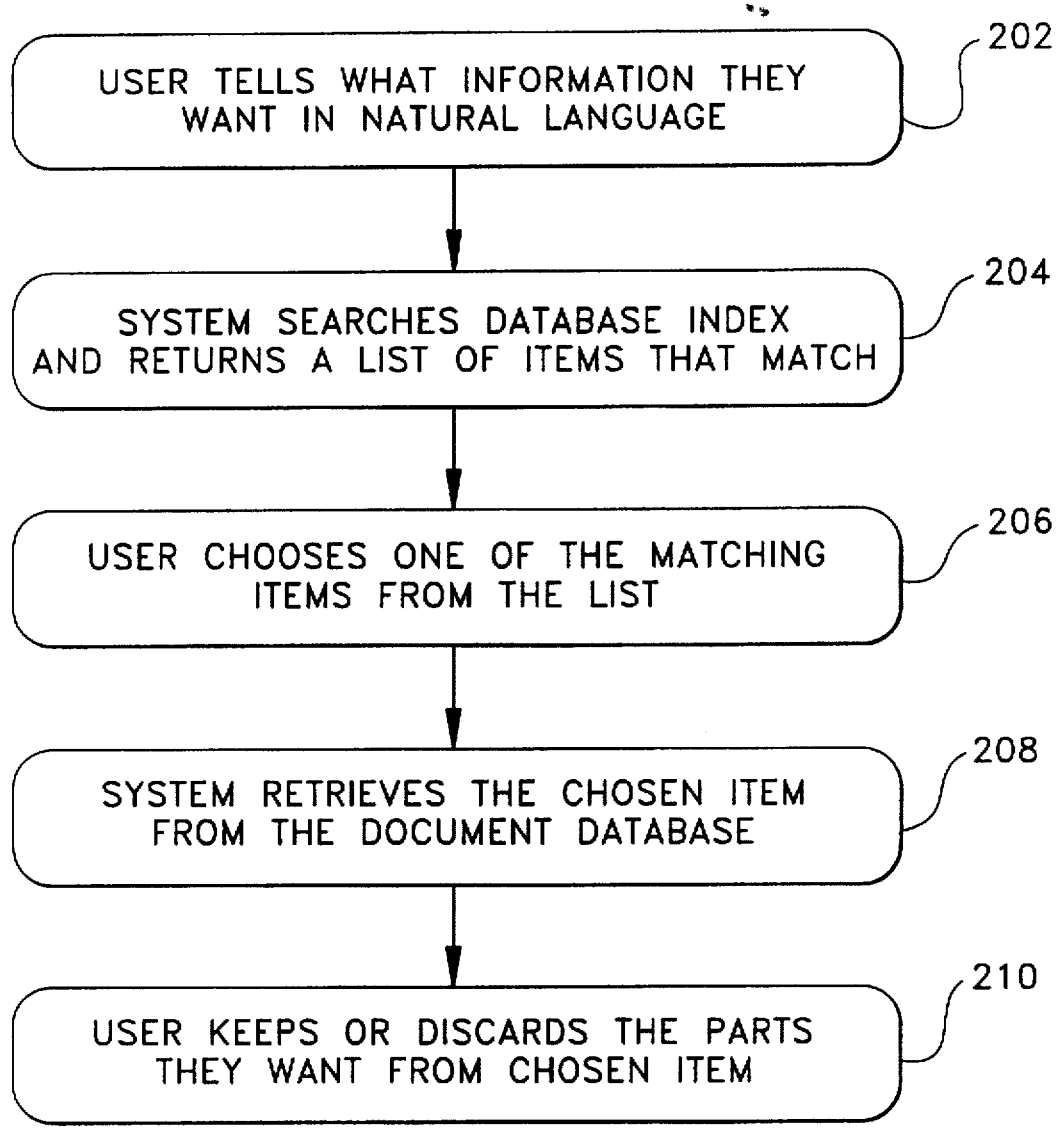
FIG. 2 is a simplified process flow diagram illustrating a user session which may be performed with the information retrieval system shown in FIG. 1, in accordance with a preferred embodiment of the present invention.

Referring now to FIG. 2, there is shown a simplified process flow diagram illustrating a user session 200 which may be performed with information retrieval system 100 shown in FIG. 1, in accordance with a preferred embodiment of the present invention. In step 202 of user session 200, the user station 102 communicates to data center 110 (via channel 108) a description of the information that a user of user station 102 would like to identify at data center 110. More specifically, in step 202 the a user of user station 102 sends a "natural language search query" to data center 110. As described more fully below in connection with FIG. 4, the term "natural language search query" is used to refer to a question, sentence, sentence fragment, single word or term which describes (in natural language form) a particular topic or issue for which a user of user station 102 seeks to identify information. Based on the natural language query provided by user station 102, the query server 116 in data center 110 searches a document index database 117 (shown in FIGS. 3 and 5A) coupled to the query server, and a list of fries responsive to the search query are returned to user station 102, as shown in step 204. Next, in step 206, the the user of user station 102 may select for retrieval one of the listed files identified by data center 110. In step 208, session server 114 in data center 110 retrieves the full text, image, audio or other multi-media information associated with a selected file from the library database 118. In step 210, the user of user station 102 is given the option of keeping or discarding portions of the retrieved file. As explained more fully below, the user of user station 102 may use some or all of any retrieved file to compose a document directed to the search query.

Detailed Overview of System Operation

Figure 3:
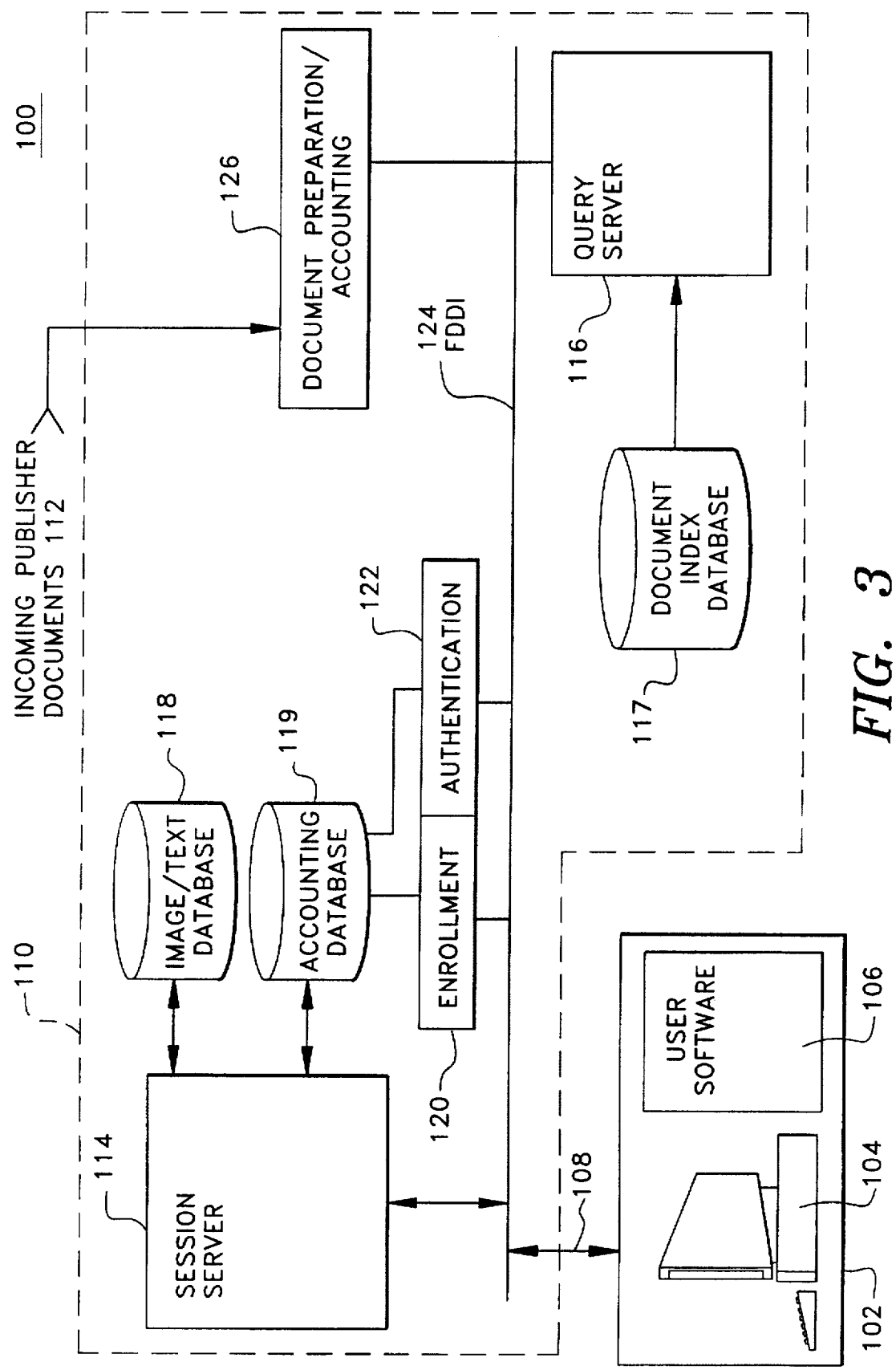
FIG. 3 is a more detailed block diagram showing an information retrieval system in accordance with a preferred embodiment of the present invention.

Referring now to FIG. 3, there is shown a more detailed block diagram showing the overall operation of information retrieval system 100, in accordance with a preferred embodiment of the present invention. The information retrieval system shown in FIG. 3 is a more detailed representation of the information retrieval system 100 shown in FIG. 1. As shown in FIG. 3, data center 110 includes image/text database 118 for storing document files representative of each of the publisher documents 112 received in data center 110. The image/text database 118 is coupled to session server 114 which, as explained more fully below, uses image/text database 118 to retrieve the full text/image of individual documents selected by user station 102 during a user session. An accounting database 119 is also coupled to session server 114. The accounting database 119 is used to store royalty and marketing information generated during operation of system 100. A document index database 117 is coupled to query server 116. As explained more fully below in connection with FIG. 4, document index database 117 contains a list of search terms corresponding to potential search terms which may appear in a search query. For each search term listed in the document index database 117, document index database 117 stores the document identification number corresponding to each document file (stored in image/text database 118) that includes that search term, along with location information corresponding to the location of the search term in each such document file. Although in the preferred embodiment of the present invention, database 118 stores document files representative of textual documents, still digital video images, motion digital video sequences, and digital audio sequences, it will be understood by those skilled in the art that any other type of multi-media object file, such as, for example, multi-media object files containing graphical images, may also be stored on database 118.

Figure 6:
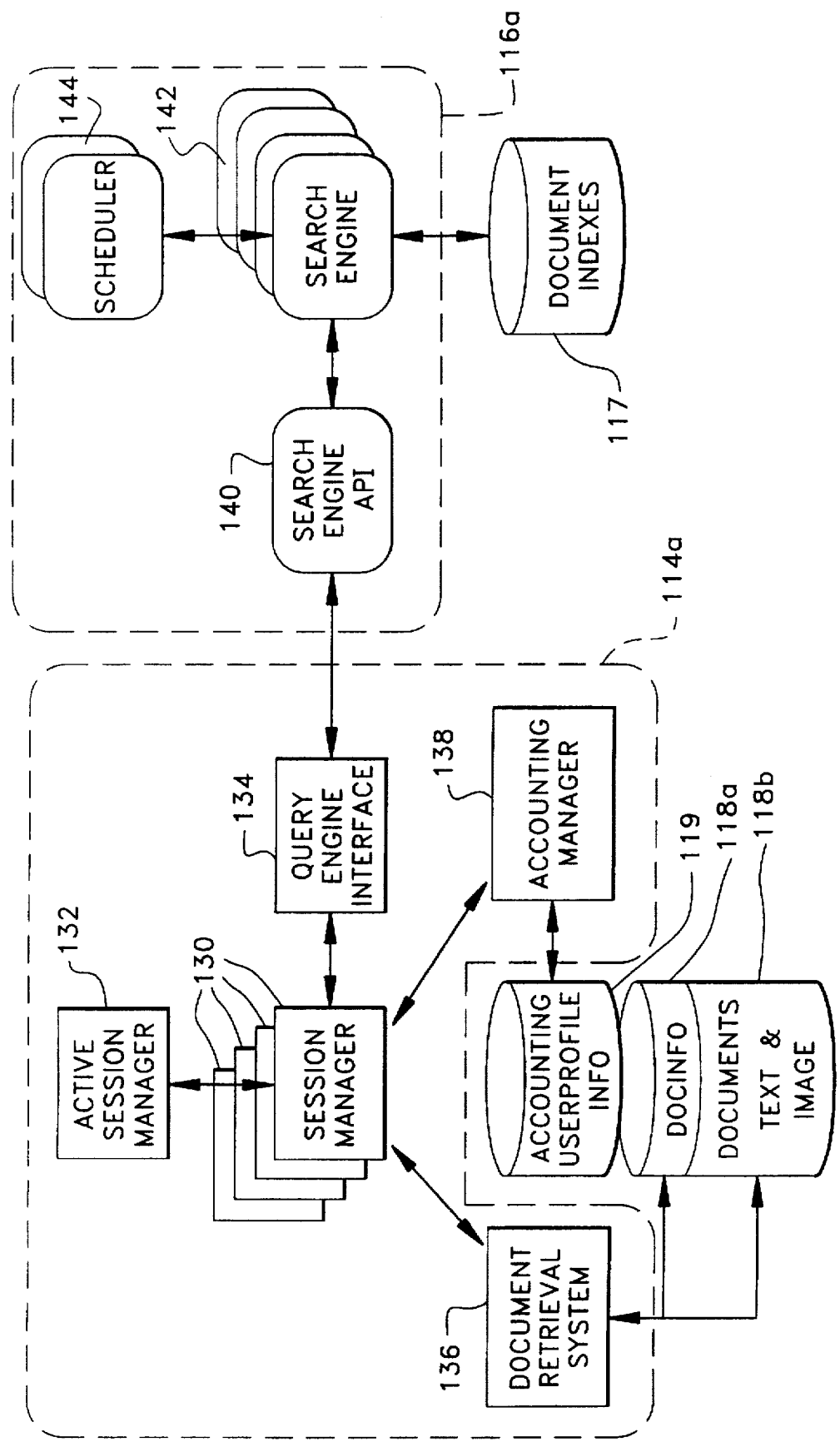
FIG. 6 is a block diagram illustrating the operation of software systems for implementing the session and query managers shown in FIG. 4, in accordance with a preferred embodiment of the present invention.

Responsibility for executing the tasks associated with receiving queries from user station 102, processing and performing searches based on such queries, returning the results of the queries to user station 102, and retrieving and transmitting documents selected by a user to user station 102, are divided between session server 114 and query server 116, which are connected to each other and to channel 108 by Fiber Distributed Data Interface (FDDI) 124. For purposes of the present application, the term "server", when used in conjunction with "session" or "query", is used to refer to a physical machine formed from at least one computer processor having associated memory and software installed thereon for executing the functions to be performed by the server. In the preferred embodiment of the present invention, the hardware platform used for implementing session server 114 consists of a Tandem® 4412 computer having 2 processors, 256 MB of memory, a 2 GB system disk, and a 2 GB RAID disk; a flow diagram illustrating the operation of a preferred software system 114a for implementing session server 114 on this hardware platform is shown in FIG. 6 and discussed in connection with FIGS. 4 and 6A below. In the preferred embodiment of the present invention, the hardware platform used for implementing query server 116 consists of a Tandem® 4412 computer having 2 processors, 1 GB of memory, a 2 GB system disk, and a 8 GB RAID disk; a flow diagram illustrating the operation of a preferred software system 116a for implementing session server 116 on this hardware platform is shown in FIG. 6 and discussed in connection with FIGS. 4 and 6B below. Although specific hardware is disclosed herein for implementing session server 114 and query server 116, it will be understood by those skilled in the art that other suitable hardware platforms may alternatively be used to implement servers 114, 116. However, the two Tandem® hardware systems described above for implementing servers 114, 116 are preferred because these systems allow servers 114, 116 to be hardware-scalable. This "hardware sealability" allows data center 110 to handle an increasing number of user stations 102 simply by adding farther processors to the existing hardware used for servers 114, 116, without modification of the software running on such hardware.

In addition to managing the search and flow of information during a user session, the session manager 114 attends to various accounting and subscriber services. The information required for performing the accounting and subscriber services is stored in a separate accounting database 119. In performing these operations, session manager 114 functions in conjunction with enrollment means 120 and authentication means 122 which are also coupled to accounting database 119. As described more fully below in conjunction with FIG. 4, enrollment means 120 functions to initiate new (first time) users into data center 110. Enrollment means 120 "enrolls" each new user into data center 110 by causing subscriber information representing the new user to be entered into accounting database 119. On subsequent accesses to data center 110 by a previously enrolled user, authentication means 122 determines that the user is already enrolled in the data center 110 by accessing records stored within the accounting database 119.

Data preparation within the document preparation/ accounting means 126 of data center 110 includes means for document filtering, document loading and indexing of new documents received by the data center 110 from a plurality of document publishers 112. Documents received from a publisher 112 are in a publisher-specific format. In the filtering step of the document preparation process, a document received from a publisher 112 is converted to a universal publisher processing format. The universal publisher processing format is a single format used by data center 110 for storing and retrieving all documents received from various publishers 112.

Figure 4:
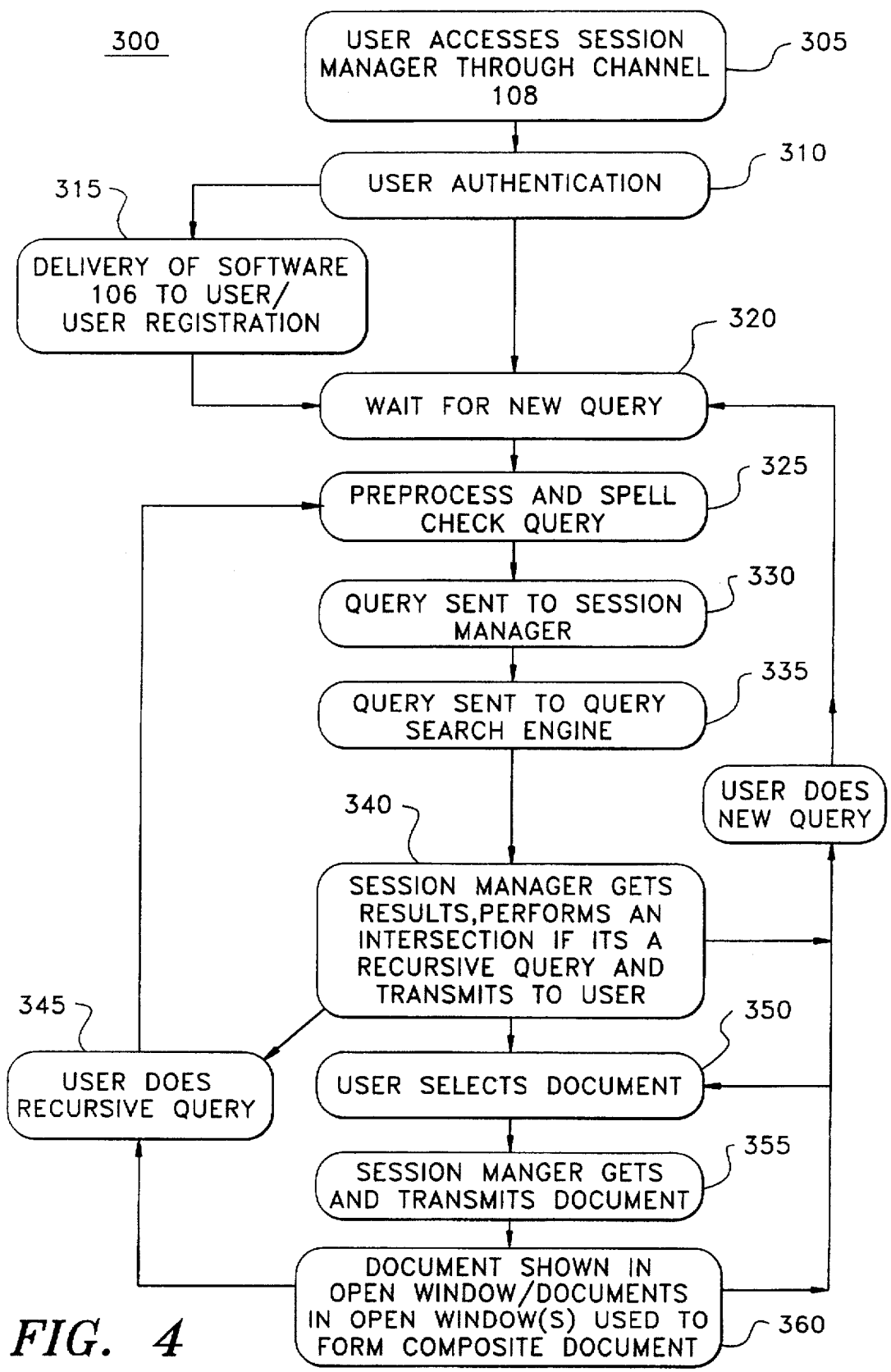
FIG. 4 is a more detailed process flow diagram illustrating a user session which may be performed with the information retrieval system shown in FIG. 3, in accordance with a preferred embodiment of the present invention.

Referring now to FIG. 4, there is shown a process flow diagram illustrating the steps in an exemplary user session 300 which may be performed using the information retrieval system 100 shown in FIG. 3, in accordance with a preferred embodiment of the present invention. Initially, in step 305, a user station 102 accesses the data center 110 by establishing a communications link over communications channel 108 between PC 104 and FDDI 124 within data center 110. As explained above, communications channel 108 may consist of a communications link formed over a public network such as the Interact. Alternatively, communications channel 108 may consist of a communications link formed between PC 104 and FDDI 124 over a commercial network. Thus, commercial networks such as, for example, the Prodigy® network, the CompuServe® network, or the Microsoft® network, may be used to establish a communications channel 108 for linking PC 104 and FDDI 124. Once this communications link is established, processing proceeds to step 310, where the authentication means 122 attempts to authenticate the user of user station 102. More particularly, based on information input by the user, authentication means 122 determines whether the user is authentic, i.e. whether the user is authorized to access data center 110. If the user is authentic, but has not used accessed data center 110 previously, processing proceeds to step 315, where enrollment means 120 optionally downloads a copy of software system 106 onto PC 104, and optionally executes software 106. In addition, in step 315 the enrollment means 120 requests the user to provide personal "enrollment information" about him/herself such as, for example, the user's full name, address, grade level, gender, occupation, the occupations of the user's parents, the numbers of brothers and/or sisters of the user, the type of computer used by the user, the user's modem speed, the display capabilities of the user's display, the size of the memory of the user's PC, and the identity of the communications link (e.g., the Interact, the Prodigy® network, the CompuServe® network, or the Microsoft® network) used for accessing the system. Each new user enrolled by enrollment means 120 is assigned a unique user identification number. The enrollment (or subscriber) information received by enrollment means 120 is stored on accounting database 119 together with the user identification number corresponding to the new user in the form of individual records corresponding to each enrolled user. In the embodiment shown in FIG. 3, enrollment means 120 and authentication means 122 are implemented in software on a separate machine which is physically distinct tom the processor(s) used for implementing session server 114. In an alternative embodiment (not shown), enrollment means 120 and authentication means 122 may be implemented in software as part of session server 114. In this alternative embodiment, enrollment means 120 and authentication means 122 may be implemented on the same processor(s) used for implementing session server 114.

Referring still to FIG. 4, following steps 310, 315, processing proceeds to step 320, where software 106 on PC 104 waits for the user to input a search query. The search query represents a topic, issue or question about which the user desires to locate information. In the preferred embodiment, the search query is provided by the user in a natural language format. Thus, for example, if the user wants to locate relevant sources of information indicating how many soldiers were killed in Vietnam, the user might enter the query, "How many soldiers were killed in Vietnam." The query may be entered in the form of a complete sentence, or as phrase or sentence fragment, such as, "Vietnam casualities". In an alternate embodiment, the query may be entered by the user in a non-natural language format wherein the user identifies one or more key words to be searched, whether the key words should be searched conjunctively or disjunctively, and, for key words to be searched conjunctively, the distance between which the key words must fall relative to one and other to come within the scope of the search.

Following the inputting of the search query, processing proceeds to step 325 where software system 106 spell checks the search query. The purpose of spell checking the search query prior to sending the query to data center 110 is to prevent the wasting of resources at data center 110 that would likely result if data center 110 attempted to process a search query with a spelling error. After the search query has been spell checked, processing proceeds to step 330, where the spell checked search query is transmitted by PC 104 over communications channel 108 to session server 114.

Upon receipt of the query by session server 114, processing proceeds to step 335, during which the search query is transmitted from the session server 114 to the query server 116 which processes the search query. More particularly, in this step, query server 116 scans its document index database 117 based on the user's search query in order to identify document identification numbers representing textual documents and multi-media files relevant to the search query.

The document index database 117 searched by query server 116 contains a list of search terms corresponding to potential search terms which may appear in or be related to words or terms in a search query. For each search term listed in the document index database 117, document index database 117 stores the document identification number corresponding to each document file (stored in database 118) that includes that search term, along with location information corresponding to the location of the search term in each such document file. Further details regarding the structure and operation of document index database 117 are shown in FIG. 5B and discussed later in this specification.

The term "document file" is used in the present application to mean a file in database 118 which stores either a textual document or, alternatively, a file which stores a multi-media record such as, for example, a still image, a sequence of motion digital video flames, or a sequence of digital audio flames. In contrast to files solely representing textual documents, each multi-media file in database 118 is stored along with a separate portion of text related to the multi-media record (referred to below as the "associated text field" or "image text-type information field" corresponding to each such multi-media file). This associated text field is used as the basis for generating document index information (for storage on document index database 117) corresponding to each multi-media file stored in database 118. More particularly, for each search term listed in the document index database 117, document index database 117 stores the document identification number corresponding to each multi-media file having an associated text field which includes that search term, along with location information corresponding to the location of the search term in the associated text field. In view of the fact that document index database 117 stores index information for both textual document files and multi-media files, the scan of document index database 117 by query server 116 in step 335 simultaneously identifies document identification numbers representing both textual documents and multi-media records relevant to the search query. In a preferred embodiment of the present invention, the associated text or image text-type information field associated with a multi-media record such as, for example, a still image, may consist of a caption, article or other text which a publisher 112 may have published in connection with the still image.

The identification numbers of the textual documents and multi-media files identified during the search are then used by the query server 116 to form a search results list which contains entries representing the document identification number of each textual document and multi-media file identified in the search. In the preferred embodiment, query server 116 performs a relevance ranking on each of the textual documents and multi-media files identified by the search by generating a relevance score corresponding to each of the entries on the search result list. This relevance scoring operation is performed by query server 116 based on, among other things, the term location information contained in index database 117. More particularly, the relevance score for each document file is based in part on the relative proximity within the document file of terms forming the search query, i.e., the closer various search terms are to one and other in the document file, the higher the relevance score. Of course, for textual documents this proximity evaluation is performed based on the location of the search terms within the text document itself, whereas for multi-media files, this proximity evaluation is performed based on the location of the search terms within the associated text fields of such multi-media files. Once a relevance score has been determined for each document identification number returned by the search, the query server 116 then forms a relevance ordered search result list by ordering the document identification numbers (or entries) in the search result list in accordance with their respective relevance rankings such that an entry having a highest relevance ranking represents a first entry on the relevance ordered search result list. In the preferred embodiment, entries corresponding to textual documents and entries corresponding to multi-media files will typically be interspersed within the relevance ordered search result list. The document index searching and relevance scoring operations performed by query server 116 are preferably implemented in part using commercially available searching software such as the Conquest™ search engine program marketed by Excalibur™ Technologies.

In step 340, following file generation of the relevance ordered search result list by query server 116, the relevance ordered search result list is transmitted from query server 116 to session server 114. In the event the search query initially provided by the user in step 320 was a recursive search query (i.e., the search query was to be performed only on the results of a prior query), a logical AND operation is performed between the document identification numbers on the current search results list and the document identification numbers on the previous search results list to form a new current relevance ordered search results list which session server 114 then transmits to user station 102 via channel 108; otherwise, if the query initially provided in step 320 was not a recursive search query, session server 114 simply transmits the relevance ordered search results list from query server 116 directly to user station 102. Following receipt of the relevance ordered search results list by user station 102, session server 114 retrieves bibliographical information (from database 118) corresponding to the document identification numbers in the search results list, and this bibliographical information is then transmitted to user station 102 over channel 108. For each document associated with a document identification number on the search results list, the bibliographical information retrieved and transmitted in this step includes, for example, the document title, author, publisher name, publication date, publication name and edition. A preferred data structure used for retrieving this bibliographical information from database 118 is discussed below in conjunction with FIG. 5.

Figure 4A:
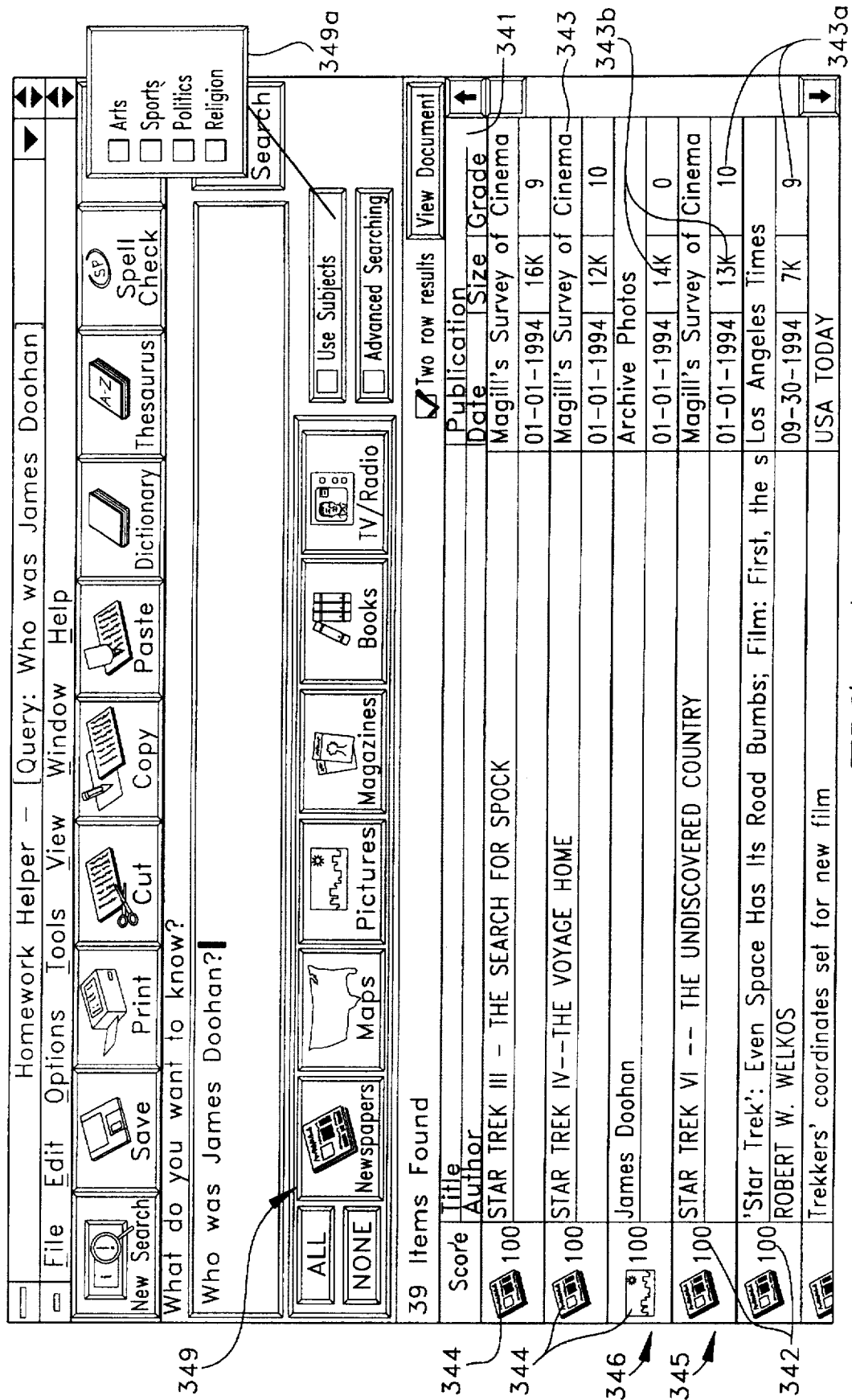
FIG. 4A is a diagram illustrating an exemplary search results list displayed in an open window on a user's personal computer, in accordance with a preferred embodiment of the present invention.

Upon receipt of this bibliographical information, user PC 104 together with software 106 display the search results list (or a portion thereof), together with (i) the relevance scores corresponding to each document identification number on the search results list (ii) bibliographical information corresponding to each document identification number on the search results list, and (iii) an indication whether the document file corresponds to a textual document or a multi-media file such as, for example, a file representing a still image. This information is displayed in a display window on PC 104 in relevance ranked order such that the document file(s) with a highest relevance score is/are displayed at the top of the list. FIG. 4A shows an exemplary search results list displayed in an open window 341 on PC 104. As seen in FIG. 4A, the image displayed in window 341 includes relevance scores 342, bibliographical information 343, readability information 343a, size information 343b, and a file type indicator 344 (for indicating whether the document file corresponds to a textual document or a multi-media file). Relevance scores 342 are listed in descending order from highest to lowest, and files 345 representing textual documents and files 346 representing multi-media documents are interspersed in the list displayed in window 341.

Once the document file information described immediately above is displayed in window 341, the user may either select one of the documents listed in window 341 for retrieval, or may instead perform a recursive search or a new search. If the user desires to perform a recursive search, processing proceeds to step 345, after which the process is repeated from step 325. However, as described above, during this recursive searching operation a logical AND operation is performed between the document identification numbers on the current search results list and the document identification numbers on the previous search results list to form a new current search results list in step 340. If the user desires to perform a new (non-recursive) search, processing proceeds to step 325 and the process is again repeated.

Figure 4B:
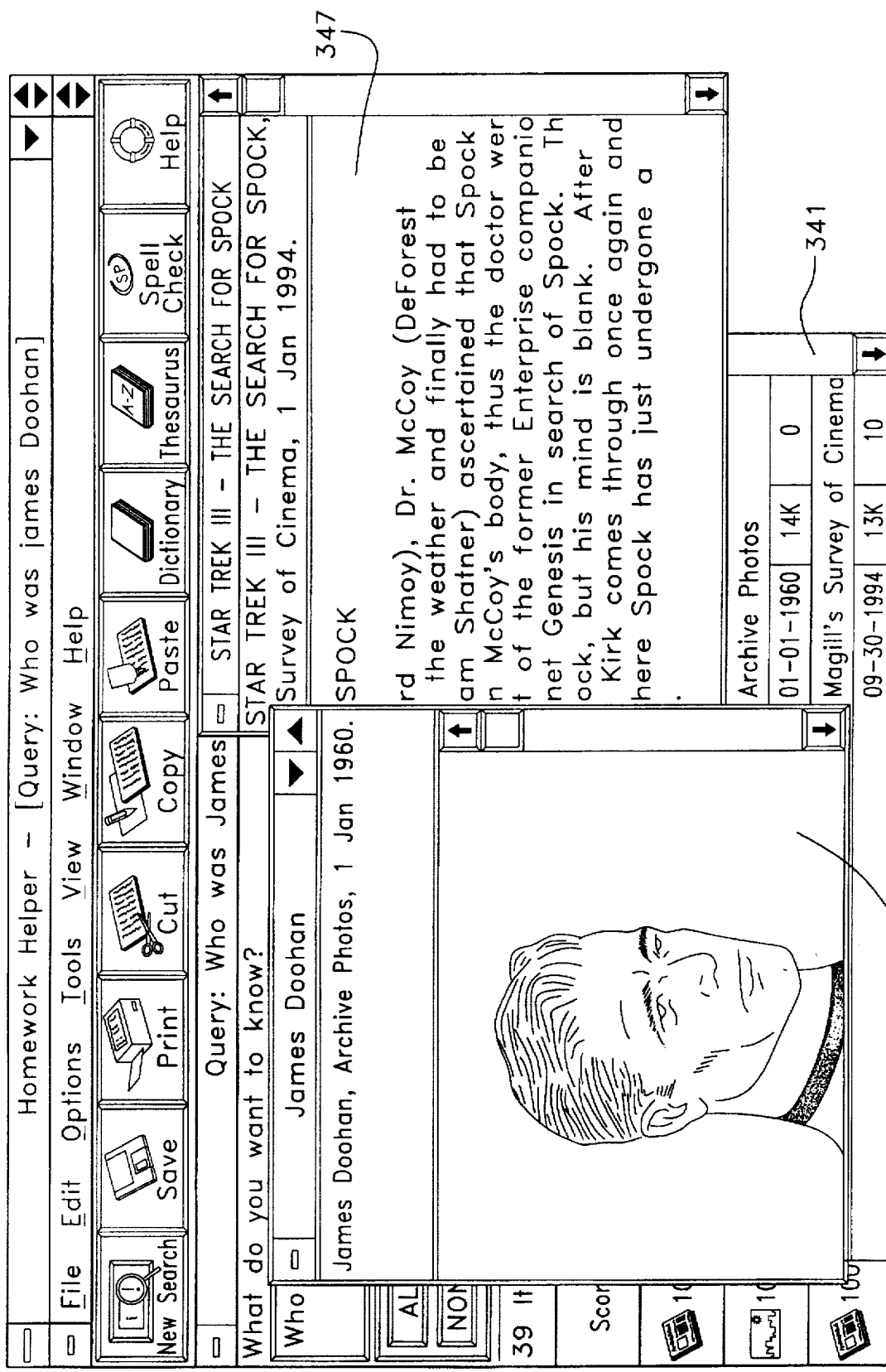
FIG. 4B is an exemplary diagram illustrating first and second open windows on a user's personal computer which respectively display text and video information corresponding to document and multi-media files selected by the user for retrieval, in accordance with a preferred embodiment of the present invention.
Figure 4C:
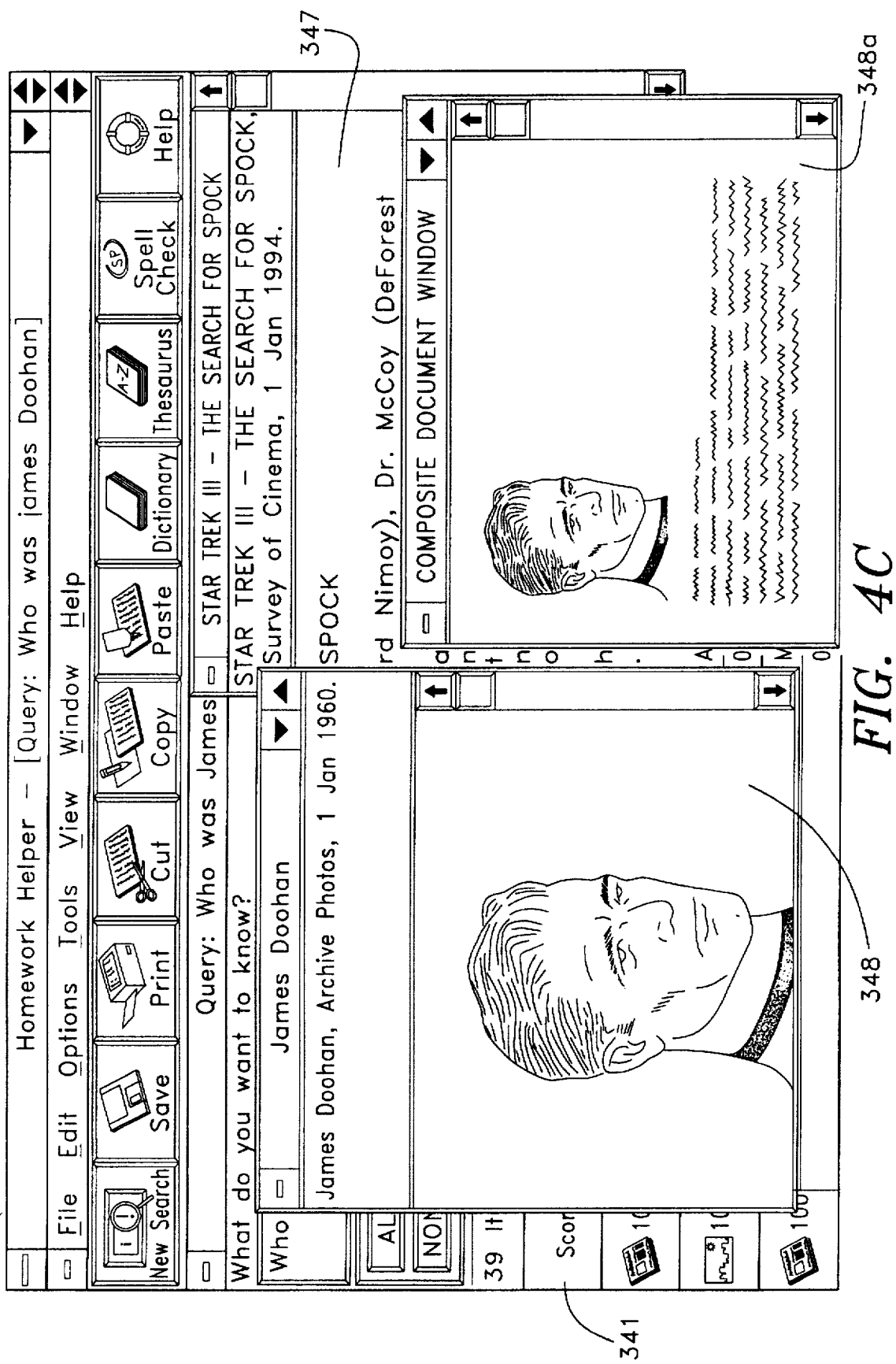
FIG. 4C is an exemplary diagram illustrating first and second open windows on a user's personal computer which respectively display text and video information corresponding to document and multi-media files selected by the user for retrieval, and a composite document window in which the user has built a composite document based on the text and video information in the first and second windows, in accordance with a preferred embodiment of the present invention.

Alternatively, if, after step 340, the user wishes to retrieve a document file for display on PC 104, processing proceeds to step 350 where the user selects one of the documents in the search list for display, preferably by "clicking" with a computer mouse of the portion of window 341 wherein information corresponding to the selected document file is displayed. Following the selection of a document file by the user, PC 104 transmits a signal representative of the selected document file to session server 114 over channel 108. Upon receipt of this signal in step 355, session server retrieves from database 118 and transmits to PC 104 the text (if the selected document file corresponds to a textual document), image bitmap (if the selected document file corresponds to a still image), sequence of video frames (if the selected document file corresponds to a motion video sequence) or sequence of digital audio flames (if the selected document file corresponds to a digital audio sequence) associated with the selected document file. In step 360, upon of receipt of such text or multi-media information from session server 114, PC 104 together with software 106 display the text or multi-media information retrieved by session server 114 in a second display window open on PC 104. Following step 360, the user may repeat the process from step 350 to retrieve and display further text or multi-media information from other selected document files in further display windows open on PC 104. FIG. 4B is an exemplary drawing showing first and second windows 347, 348 which respectively display text information corresponding to a text document file 345 and video image information corresponding to multi-media file 346. As seen in FIG. 4B, the information displayed in windows 347 and 348 may be displayed simultaneously with the search results list shown in window 341. In addition, software 106 is adapted to permit the user to also simultaneously open a document composition window 348a (shown in FIG. 4C) on PC 104. Using the cut, copy and paste buttons on the graphical user interface shown in FIG. 4C, the user may cut/copy/paste both text and video information from windows 347, 348 (or from farther display windows not shown but which represent other selected document files) into the document composition window 348a in order to form a composite document that pertains to the search query input by the user in step 320. The composite document may, for example, include text information from one or more of the document files selected by the user in step 350, as well as multi-media information such as, for example, still images. Using the save and print buttons on the graphical user interface shown in FIG. 4C, the user may selectively save (on PC 104) and/or print text or image information from windows 347, 348 or 348a.

Data Storage Formats

Figure 5:
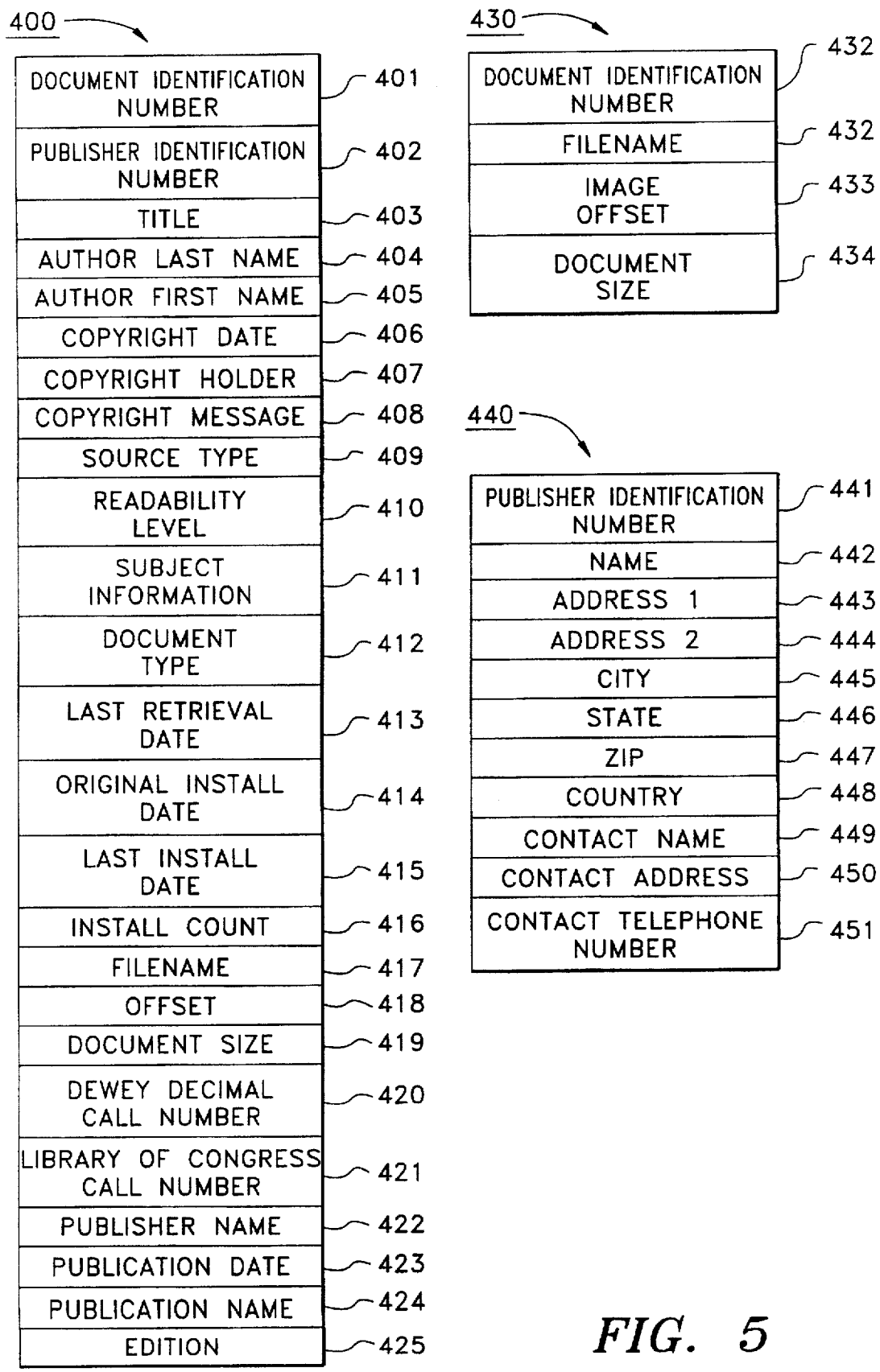
FIG. 5 is a diagram illustrating preferred data structures for storing a document information directory table, a dependent image table, and publisher information table, in accordance with a preferred embodiment of the present invention.
Figure 5A:
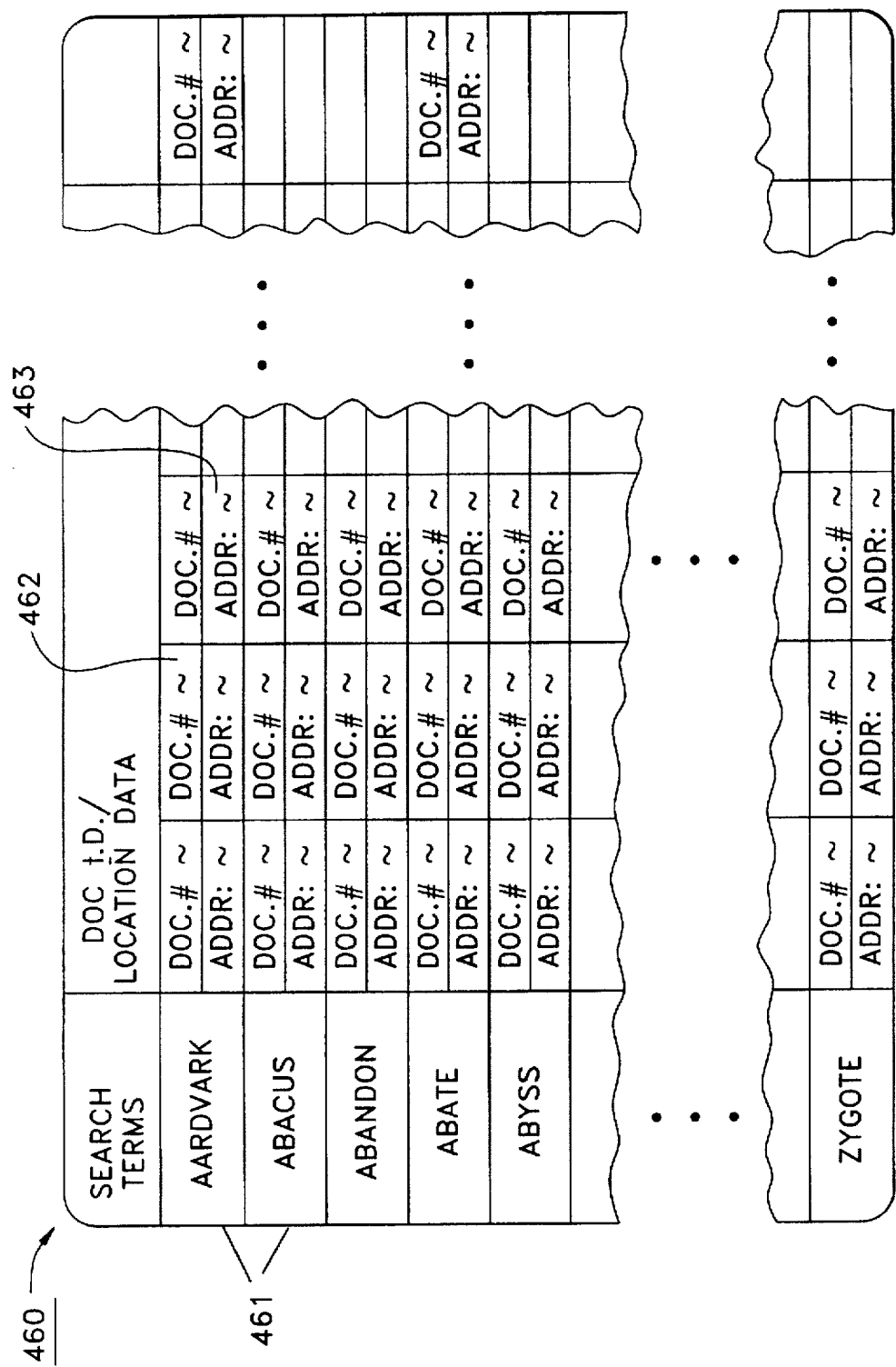
FIG. 5A is a diagram illustrating a preferred data structure for implementing a document index database, in accordance with a preferred embodiment of the present invention.
Figure 5B:
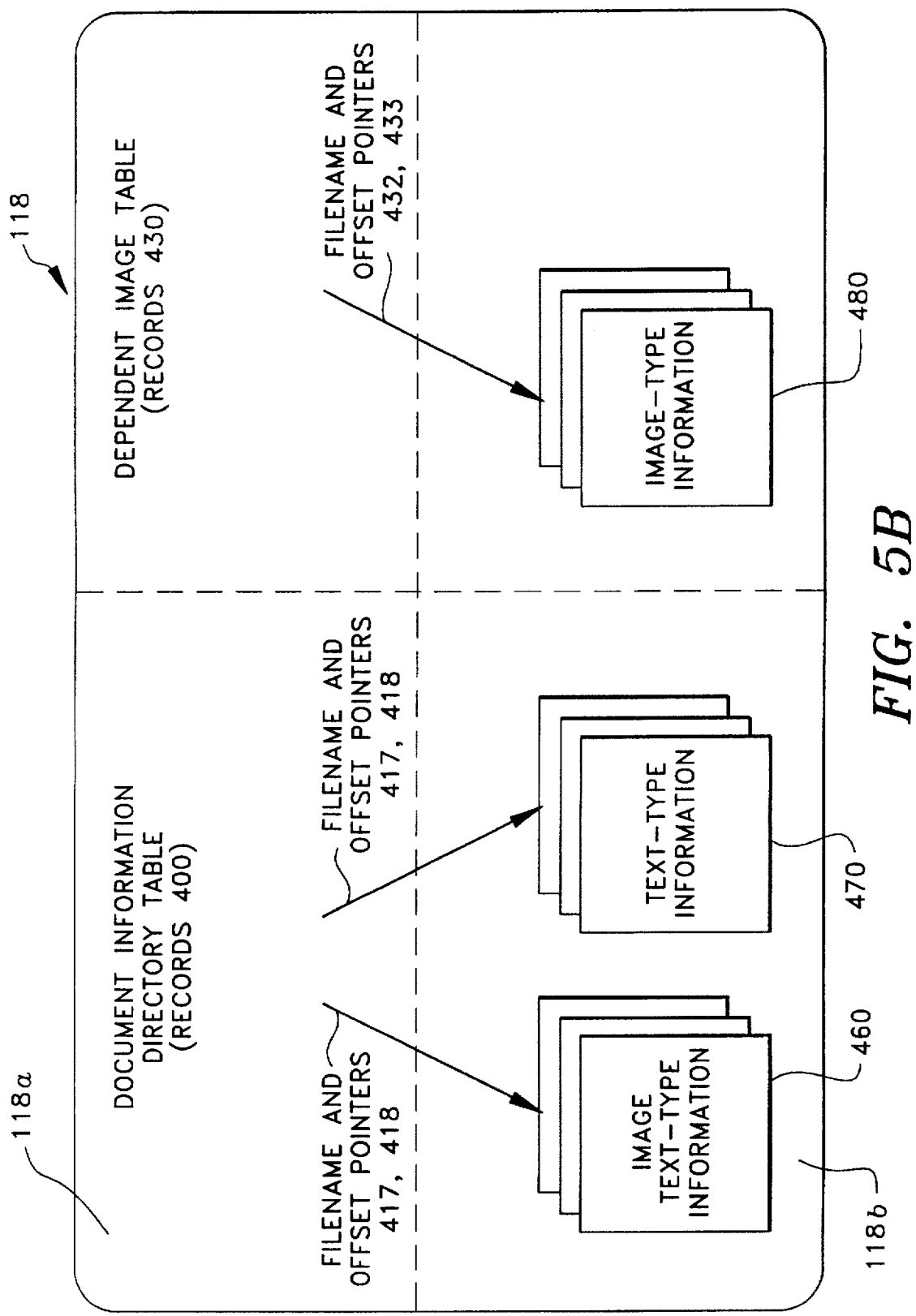
FIG. 5B is a diagram illustrating a preferred data storage format for implementing an image/text database, in accordance with a preferred embodiment of the present invention.

Referring now to FIGS. 5 and 5B, during operation of data center 110, session sewer 114 retrieves various document/image information from database 118. In the preferred embodiment of the present invention, a document information directory table is stored on database 118. For each textual document and multi-media file on database 118, the document information directory table includes an individual file header record 400 formed of approximately 25 separate information fields. Record 400 includes a document identification number field 401 for storing a unique document identification number that is associated with each textual document or multi-media file at the time the textual document or multi-media file is prepared for input into data center 110. A discussion of a preferred system for preparing textual documents and multi-media files for input into data center 110 is set forth later in this specification. Record 400 also includes a publisher identification number field 402 for storing a unique publisher identification number representing the publisher of the textual document or multi-media file associated with record 400. As discussed more fully below, the publisher identification number stored in field 402 corresponds to an entry point into a publisher information table which includes a plurality of publisher information records 440. For each publisher having a textual document and/or multi-media file stored on database 118, the publisher information table includes an individual record 440 formed of approximately 10 separate information fields for storing information about the publisher associated with the document or file.

Record 400 also includes several fields for storing bibliographical information about the textual document or multi-media file associated with record 400. The bibliographical information fields include a title field 403 for storing the title of the textual document or multi-media file associated with record 400, an author last name field 404 and an author first name field 405 for storing the name of the author of the textual document or multi-media file associated with record 400, a publisher name field 422 for storing the name of the publisher of the textual document or multi-media file associated with record 400, a publication date field 423 for storing the publication date of the textual document or multi-media file associated with record 400, a publication name field 424 for storing a publication name in which the textual document or multi-media file associated with record 400 appeared, and an edition field 425 for storing a number representing the edition of the publication in which the textual document or multi-media file associated with record 400 appeared. As described above in connection with FIG. 4, session server 114 retrieves (from database 118) bibliographical information corresponding to the fields set forth immediately above in step 340 (of user session 300) for each document identification number included on the search results list transmitted from query server 116, and then transmits such information to PC 104 where it is displayed as bibliographical information 343.

Record 400 also includes several fields for storing copyright information about the textual document or multi-media file associated with record 400. The copyright information fields include a copyright date field 406 for storing a copyright date assigned to the textual document or multi-media file associated with record 400, a copyright holder field 407 for storing the copyright owner of the textual document or multi-media file associated with record 400, and a copyright message field 408 for storing a copyright message for the textual document or multi-media file associated with record 400. In a preferred embodiment of the present invention, when a user selects a document for retrieval in step 355 (of user session 300), the information stored in the copyright message field 408 associated with the selected document is retrieved (from database 118) by session server 114 and transmitted to PC 104. In this embodiment, the copyright message stored in field 408 is then displayed on user PC 104 (in step 360) together with the text, image bitmap, or sequence of video frames associated with the selected document.

Record 400 also includes a source type field 409 for storing information classifying the textual document or multi-media file associated with record 400 into one of a plurality of "source types." In a preferred embodiment of the present invention, the source types reflect not only the source from which the document may have originated, but also whether the document is a text file or, alternatively, a multi-media file. A list of exemplary source types is shown generally in box 349 of FIG. 4A, and include newspapers, maps, pictures (e.g., still or motion video images), magazines, books and TV/radio (transcripts). The system 126 (discussed more fully below) for preparing textual documents and multi-media files for input into the data center 110 assigns a source type to each textual document or multi-media file at the time it is input into data center 110. The source types shown in box 349 may be selected by the user in order to focus a query search on a subset of documents in database 118 associated with one or more source types selected by the user.

Record 400 also includes a document readability field 410 for storing a readability score (or reading grade level) for the textual document or multi-media file associated with record 400. In a preferred embodiment, this readability score is determined (by system 126) for each document to be stored in database 118 using a standard readability algorithm such as, for example, the Fleish-Kincade algorithm__. In a preferred embodiment of step 340 of user session 300 (shown in FIG. 4), session server 114 retrieves (from database 118) a readability score (from field 410) for each document identification number included on the search results list transmitted from query server 116, and then transmits this readability information (along with bibliographical information for each such document identification number) to PC 104 where it is displayed as readability information 343a.

Record 400 further includes a subject information field 411 for storing information classifying the textual document or multi-media file associated with record 400 into one or more of a plurality of "subjects." In a preferred embodiment of the present invention, the possible subjects into which a document may be classified include, for example, sports, politics, literature, etc. The system 126 (discussed more fully below) for preparing textual documents and multi-media files for input into the data center 110 assigns one or more subject types to each textual document or multi-media file at the time it is input into data center 110. In addition, for each subject to which the document is assigned, system 126 assigns a subject confidence score indicating the degree to which the document relates to the subject. The possible document subjects may be selected by the user (by clicking on the "use subjects" box in window 341 to call up subject selection window 349a, and then selecting one or more subjects from subject selection window 349a) in order to focus a query search on one or more selected subjects. In an alternative preferred embodiment of the present invention, search engine 142 may be adapted to use the search subjects selected by the user, together with the subject confidence scores associated with documents identified during a query search, to calculate relevance scores for the documents identified during the query search.

Record 400 also includes a document type field 412 for storing a "document type" assigned to the textual document or multi-media file associated with record 400. In a preferred embodiment of the present invention, the document type field 412 reflects whether the document is a text file, a still image, a sequence of motion video images, or a sequence of digital audio images. The system 126 (discussed more fully below) for preparing textual documents and multi-media files for input into the data center 110 assigns a document type to each textual document or multi-media file at the time it is input into data center 110. In a preferred embodiment of step 340 of user session 300 (shown in FIG. 4), session server 114 retrieves (from database 118) a document type (from field 412) for each document identification number included on the search results list transmitted from query server 116, and then transmits this document type information (along with bibliographical information for each such document identification number) to PC 104 where it is displayed in the form of a file type indicator 344.

Record 400 also includes a last retrieval date field 413 for storing the date on which the textual document or multi-media file associated with record 400 was last retrieved for a user by document retrieval system 136 (discussed below in conjunction with FIG. 6). The information stored in the last retrieval date field is update each time document retrieval system 136 retrieves the textual document or multi-media file associated with record 400 in response to a user request.

Record 400 further includes three fields for storing information about when, and how often, the textual document or multi-media file associated with record 400 has been installed on database 118. In particular, an original install date field 414 is provided for storing the date the textual document or multi-media file associated with record 400 was first stored on database 118, a last install date field 415 for storing the most recent date on which the textual document or multi-media file associated with record 400 was installed on database 118, and an install count field 416 for storing the number of times the textual document or multi-media file associated with record 400 has been installed on database 118. Thus, if the textual document or multi-media file associated with record 400 had been installed on database 118 on three separate occasions, field 414 would store the first installation date, field 415 would store the last installation date, and field 417 would store an installation count of three. System 126 for preparing textual documents and multi-media files for input into the data center 110 updates fields 414, 415 and 416 for each textual document or multi-media file at the time it is input into data center 110 and loaded onto database 118.

Record 400 further includes a filename field 417 for storing a filename in database 118 wherein either (i) the full body of the textual document represented by record 400 (if record 400 represents a textual document), or (ii) a separate body of text associated the digital video or audio file represented by record 400 (if record 400 represents a multi-media file) is stored. For records 400 representing textual documents, the full body of the textual documents are stored in the text-type information fields 470 (shown in FIG. 5B). For records 400 representing multi-media files, the separate bodies of text associated with such records are stored in image text-type information fields 460 (shown in FIG. 5B). Offset field 418 stores a location pointer indicating the starting location of either the text-type information or image text-type information field corresponding to the filename stored in field 417. Thus, if record 400 represents a textual document, offset field 418 points to the beginning of a text-type information field 470 wherein the full body of the textual document associated with record 400 is stored; alternatively, if record 400 represents a multi-media file, offset pointer 418 points to the beginning of an image text-type information field 460 wherein the associated text field corresponding to the record 400 is stored.

Record 400 also includes a document size field 419 for storing a file size (in bytes) of the document associated with record 400. In a preferred embodiment of step 340 of user session 300 (shown in FIG. 4), session server 114 retrieves (from database 118) a size (from field 419) for each document identification number included on the search results list transmitted from query server 116 corresponding to a textual document, and then transmits this size information (along with bibliographical information for each such document identification number) to PC 104 where it is displayed as size information 343b. Finally, record 400 includes Dewey decimal call number field 420 and library of congress call number field 421, for respectively storing any Dewey decimal or library of congress call numbers corresponding to the textual document of multi-media file represented by record 400.

Referring still to FIG. 5, there is shown a dependent image record 430 used for forming a dependent image table for storing multi-media records on database 118, in accordance with a preferred embodiment of the present invention. The dependent image table includes a separate dependent image record 430 for each record 400 in the document information directory table which represents a multi-media file. Thus, each record 400 having a document type field 412 corresponding to either a still image, a sequence of motion video images, or a sequence of digital audio images, has a corresponding dependent image record 430 stored in the dependent image table. Record 430 includes a document identification number field 431 for storing the document identification number corresponding to the multi-media file represented by the record 430. For a given multi-media file stored in database 118, the same document identification number used in field 401 of record 400 is repeated in field 431 of record 430. Thus, once session server 114 has a document identification number and type information (from document type field 412) that a particular document identification number corresponds to a multi-media file, session server 114 can access further information about the multi-media file simply by using the document identification from record 400 as an entry pointer to access a further record 430 in the dependent image table.

Each record 430 includes a filename field 432 for pointing to a file in database 118 wherein only digital video or audio information represented by record 430 is stored. For each record 430, this digital video or digital audio information is stored in an image-type field 490 (shown in FIG. 5B) on database 118. Offset field 433 stores a location pointer indicating the starting location of the image-type field 490 in the file identified by field 432. Record 430 also includes a document size field 434 for storing a file size (in bytes) of the multi-media file associated with record 430. In a preferred embodiment of step 340 of user session 300 (shown in FIG. 4), session server 114 retrieves (from database 118) a size (from field 434) for each document identification number included on the search results list transmitted from query server 116 which corresponds to a multi-media file, and then transmits this size information (along with bibliographical information for each such document identification number) to PC 104 where it is displayed as size information 343b.

Referring still to FIG. 5, as mentioned above, the publisher identification number stored in field 402 of each record 400 corresponds to an entry point into a publisher information table which includes a plurality of publisher information records 440. Each publisher information record 440 includes several information fields for storing information about a publisher having textual documents or multi-media files stored on database 118. In particular, each publisher information record 440 includes a publisher identification number field 441 for storing a unique identification number associated with the publisher represented by the record 440, fields 442-448 for storing name and address information associated with the publisher represented by the record 440, and fields 449-451 for storing information identifying a contact person at the publisher represented by the record 440.

Referring now to FIG. 5A, there is shown a diagram illustrating a preferred data structure 460 for implementing document index database 117, in accordance with a preferred embodiment of the present invention. Data structure 460 contains a list of search terms 461 corresponding to potential search terms which may appear in a search query. For each search term 461 listed in data structure 460, data structure 460 stores a document identification number 462 representing each document file (stored in database 118) that includes that search term, along with location information 463 corresponding to the location(s) of the search term in each such document file. More particularly, for a given search term 461 and a given document identification number 462, location information 463 represents the location of the search term 461 in either the text-type information field 470 or the image text-type information field 460 pointed to by the offset field 418 associated with the document identification number 462. Thus, if document identification number 462 represents a textual document, location information 463 will represent the location of the search term 461 in the actual body of the text document; alternatively, if the document identification number 462 represents a multi-media file, location information 463 will represent the location of the search term 461 in the associated text field corresponding to the multi-media file.

Session/Query Server Architecture

Referring now to FIG. 6, there is shown a block diagram illustrating the operation of a session server software system 114a and a query server software system 116a for respectively implementing the session and query servers 114, 116 shown in FIG. 4, in accordance with a preferred embodiment of the present invention. Although the operation of data center 110 as described above involves only a single user station 102 and a single user session 300, in the preferred embodiment of the present invention session and query servers 114, 116 in data center 110 are adapted to simultaneously receive and process different search queries from multiple user stations 102. In accordance with this multi-user aspect of data center 110, session server software 114a includes a plurality of session managers 130, each of which is responsible for monitoring and directing a single active user session 300 corresponding to an individual user station 102. For each active user session 300, the corresponding session manager (i) sends queries received from the user station 102 to a query engine interface 134, (ii) retrieves a search results list (described above) from the query engine interface 134, (iii) retrieves bibliographical information corresponding to the documents identified in the search results list from database 118a and transmits such information to user station 102, (iv) retrieves text and multi-media files identified by user station 102 from database 118b using document retrieval system 136 and transmits such files to user station 102, (v) transmits information representing each document retrieved from database 118b and user identification information corresponding to the user station 102 that requested retrieval of that document to accounting manager 138, and (vi) updates a query log of all search queries handled through the session manager 130. An active session manager component 132 is coupled to the session managers 130, and maintains a list of all active user sessions 300 by tracking the user identification number corresponding to each user station 102 engaged in an active session 300.

The document retrieval system 136 accessed by session managers 130 includes separate retrieval systems (not shown) for retrieving text and multi-media files (such as images) from database 118b. For each document file stored in database 118, records 400 (and 430, if applicable) corresponding to the document file and representing information such as, for example, a document identification number, bibliographical data and publisher data are stored in database 118a together with one or more pointers (417, 418, 432, 433) corresponding to the location of the full text/image corresponding to the document file in database 118b. During retrieval of a textual document or multi-media file from database 118, document retrieval system 136 initially retrieves pointer information corresponding to the full text/ image of the file from the Document Information Directory Table and Dependent Image Table on database 118a, based on the document identification number of the document file to be retrieved. Based on this pointer information, document retrieval system 136 then retrieves the full text/image corresponding to the file from database 118b.

Query server software 116a includes a plurality of search engines 142, each of which is responsible for (i) executing a search query passed to the search engine 142 by session server 114a, and (ii) returning a relevance ordered search results list corresponding the query to session server 114a. The search engines 142 are each coupled to document index database 117, and schedulers 144 monitor and queue the searches performed by search engines 142 on document index database 117. Parameters representing search queries and search results are transmitted between a search engine 142 and session server 114a using a search engine application program interface (API) 140.

Operation of Session Manager

Figure 6A:
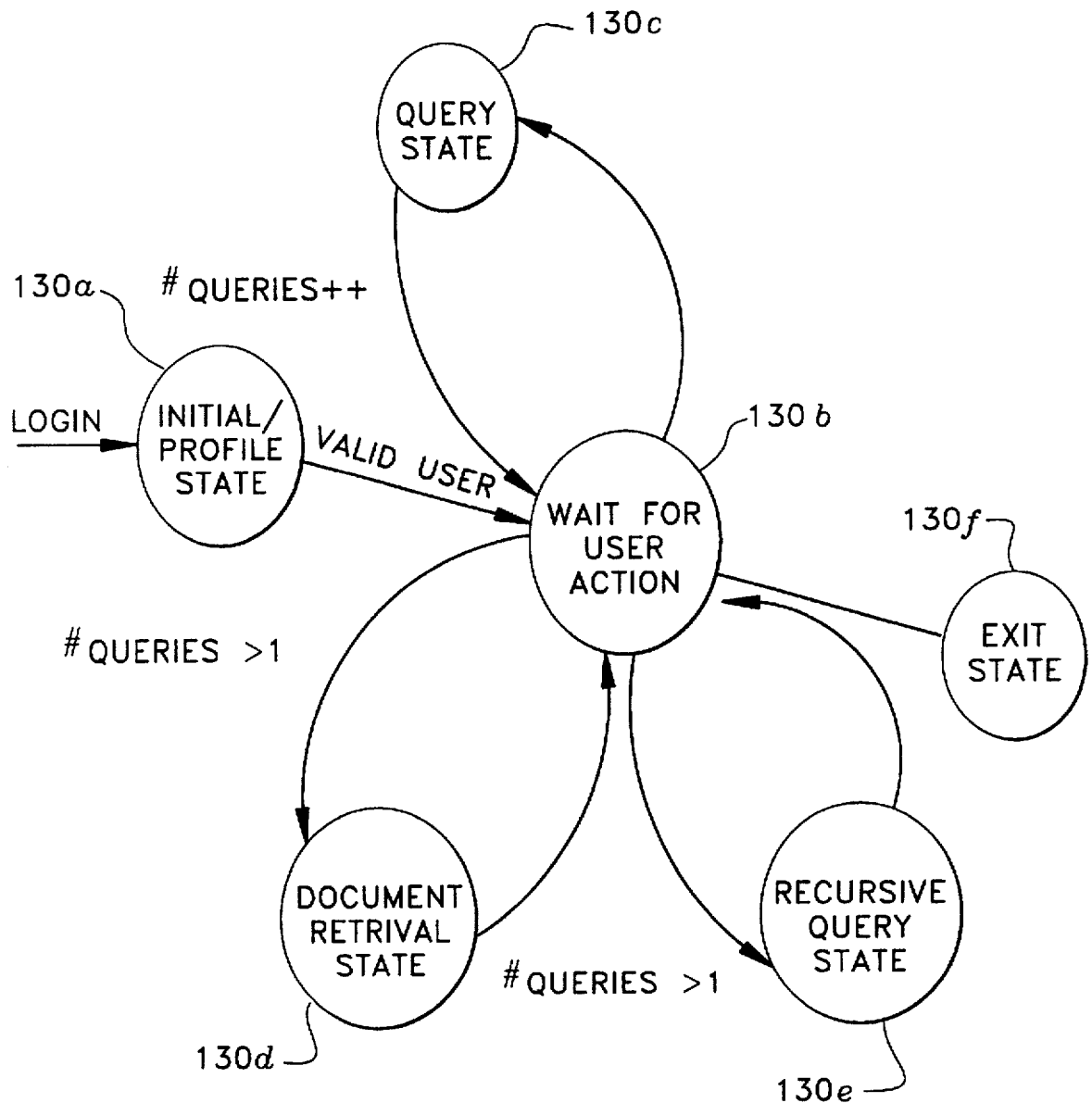
FIG. 6A is a state flow diagram showing the operation of a session manager software system, in accordance with a preferred embodiment of the present invention.

Referring now to FIG. 6A, there is shown a state flow diagram illustrating the operation of session manager software system 130, in accordance with a preferred embodiment of the present invention. Session manager software system 130 maintains the state of each ongoing user session in system 100. Entry into session manager software system 130 begins with initial/profile state 130a, which is invoked when a user login request is passed to data center 110 through communications channel 108. In the initial/profile state 130a, session manager software system 130 functions with enrollment means 120 and authentication means 122 to verify user authenticity and/or enroll new users into data center 110. The tasks performed by enrollment means 120 and authentication means 122 in state 130a correspond substantially to the enrollment and authentication functions described above in connection with steps 310 and 315 of user session 300. Once session manager software 130 authenticates a user and verifies that there are no other user sessions corresponding to the user's identification number which are active on data center 110, session manager software system 130 enters a wait for user action state 130b, which waits for a user station 102 to request services from session manager 130. As each user request is received, session manager software system 130 transitions the session server 114 into an appropriate state, and then returns back to the wait for user action state 130b after the request has been serviced. In the preferred embodiment, entry into the document retrieval state 130d and the recursive query state 130e may occur only after query server 116 has processed a search query for the user station 102, and returned a valid search results list for the search query to session server 114.

When the wait for user query state 130b is initially entered following a transition from initial/profile state 130a, the only valid transition out of the wait for user query state 130b is to query state 130c. The query state 130c is responsible for collecting search parameters input to the user station 102, sending the search parameters to the query server 116, retrieving a search results list form the query server 116, and then passing search results back to the user station 102. In the preferred embodiment, the search parameters collected from the user station 102 and forwarded to query server 116 include, at a minimum, a query string representing a natural language query entered by the user. The search parameters may also include one or more document source selections which the user of user station 102 may optionally make using box 349 (of FIG. 4A). Such document source selection (s) permit the user of user station 102 to focus the user's search only on document records having source type fields 409 corresponding to one or more selected document sources. The search parameters may also include one or more document subject selections which the user of user station 102 may optionally make using box 349a (of FIG. 4A). Such document source selection(s) permit the user of user station 102 to focus the user's search only on document records having subject information fields 411 corresponding to one or more selected subjects. Upon successful completion of the search, the query state 130c is responsible for receiving a relevance ordered search result list from the query engine 116, and then passing a relevance score 342, bibliographical information 343, readability information 343a, size information 343b and a file type indicator 344 corresponding to each document identification number on the search result list to user station 102 for display in window 341. Query state 130c is responsible for forming a "current search results list" by saving the search results list generated by query engine 116. The "current search results list" may be used in recursive query state 130e to allow the user of user station 102 to perform recursive searching. Upon completion of the above tasks, query state 130c returns control to the wait for user action state 130b.

In the event the user of user station 102 selects a document (from window 341) for retrieval, session manager software 130 enters document retrieval state 130d. In this state, session server 114 receives a signal tom user station 102 representing the document identification number of a particular document from window 341 that the user wishes to retrieve into a window 347, 348. State 130d is responsible for retrieving (using retrieval system 136) the full text, digital video or digital audio information corresponding to the selected document identification number from database 118, and passing then transmitting this document information back to user station 102. Once the appropriate document information is passed to user station 102, control is passed back to the wait for user action state 130b.

If, after receiving results the results of a first query, the user of user station 102 indicates a desire to perform a recursive query search, session manager software system 130 enters recursive query state 130e. The recursive query state 130e is responsible for collecting a further set of search parameters input by the user of user station 102, sending these search parameters to the query server 116, and retrieving a search results list from the query server 116. A logical AND operation is then performed on the document identification numbers in this search results list and the document identification numbers in the search results list previously saved (either during state 130c or 130e) in order to form a new current search results list which is then passed back to the user station 102. Once the new current search result list has been generated and saved, the query state 130e is responsible for passing a relevance score 342, bibliographical information 343, readability information 343a, size information 343b and a file type indicator 344 corresponding to each document identification number on the new current search result list to user station 102 for display in window 341. Upon completion of the above tasks, recursive query state 130e returns control to the wait for user action state 130b.

When the user of user station 102 desires to terminate a user session, session manager software 130 enters an exit state 130f; wherein session manager software 130 causes the active session manager component 132 to remove the user identification number corresponding to the user of user station 102 from the list of active user sessions.

Operation of Search Engine

Figure 6B:
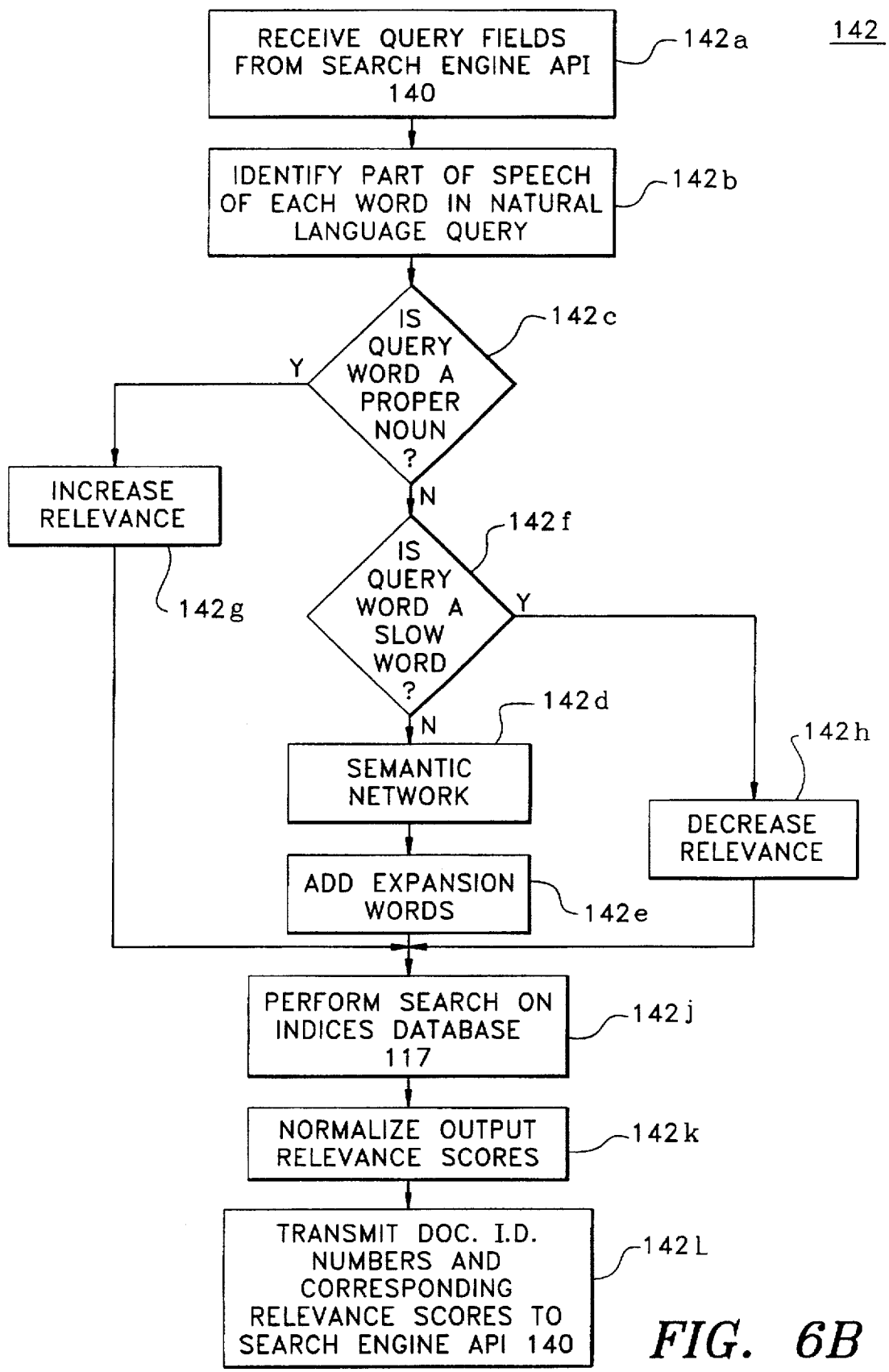
FIG. 6B is a flow diagram showing the operation of a search engine software system, in accordance with a preferred embodiment of the present invention.

Referring now to FIG. 6B, there is shown a flow diagram illustrating the operation of a software system for implementing search engine 142, in accordance with a preferred embodiment of the present invention. When a query is applied to the query server 116, all the individual terms in the query have an equal baseline weight. Thus, all terms in the query are equally likely to contribute to the selection of a document by the query server 116. However, in order to improve the search results obtained by query server 116, the weights of the terms in the query can be adjusted relative to each other in accordance with the query term weight adjustment method shown in FIG. 6B.

In step 142a, the query fields, which include a string of terms corresponding to a natural language search, are received from the search engine API 140 by the search engine 142. In step 142b, the parts of speech of each term in the natural language query is determined. The method for determining the parts of speech of the natural language query terms in step 142b includes the use of an improved Hidden Markov Model discussed below. An adjustment of the weight of each term in the query relative to the weight of the other terms of the query is determined. More particularly, in step 142c, a determination is made whether a particular term in the natural language query (or query word) is a proper noun. If the query term is not a proper noun, as determined in step 142c, a determination is made in step 142f whether the query term is a slow word. Slow words are words that have been determined, through experience, to usually be of little help in improving the results of searches. However, in some cases they are useful in improving results. Therefore, in the preferred embodiment of the invention, the weight of slow words is reduced, but the slow words are not eliminated from the query. The weight of slow words can be adjusted, for example, to about half of the baseline value. Some examples of slow words are: best, better, say, really and now.

If the query term is not a slow word or proper noun, it is applied to a semantic network in step 142d to determine expansion words corresponding to the query term. For purposes of the present invention, the term "semantic network" means a database in which each term carries with it semantic information such as, for example, part of speech and synonym information. For a given query word, only those expansion words from the semantic network which are of the same part of speech as the query term are added to the terms in the natural language query in step 142f. In step 142j, the weight adjusted terms from the original natural language query, together with any additional search words obtained by the semantic network expansion are applied to index database 117 in order to (i) identify documents (stored in database 118) that are relevant to the query search, (ii) and determine a relevance score for each document identified. In the preferred embodiment, step 142j is implemented using the Conquest™ Search engine marketed by Excalibur Technologies (hereinafter, the Conquest™ searching software).

If a query word is a proper noun, as determined in step 142c, its weight is increased in step 142g, and this increased searching weight is then used by the Conquest™ searching software in calculating relevance scores for documents identified by the search engine. The proper nouns may be adjusted, for example, to about one and half times the baseline value. Additionally, proper nouns are not applied to the semantic network for expansion. It has been determined that by-passing the semantic network in this manner for proper nouns decreases the amount of noise in the results obtained by the database search. For example, if the user submits a query search that includes the name "George Bush," a semantic network that was used to expand the term "Bush" might return, for example, words related to shrubbery because the words "bush" and "shrubbery" are synonyms. Since all search hits generated as a result of the words related to shrubbery would constitute unnecessary noise in a search directed at George Bush, the present invention avoids the addition of such noise by omitting proper nouns during the semantic network expansion of step 142d.

The output of the search performed in step 142j includes a relevance score for each document identified during the search. In step 142h (described more fully below under the heading "Relevance Normalization"), the output relevance scores are normalized. Finally, in step 142L, the document identification numbers (identified in step 142j) and normalized relevance scores corresponding to such document identification numbers are transmitted to search engine API 140.

Hidden Markov Model

Figure 7A:
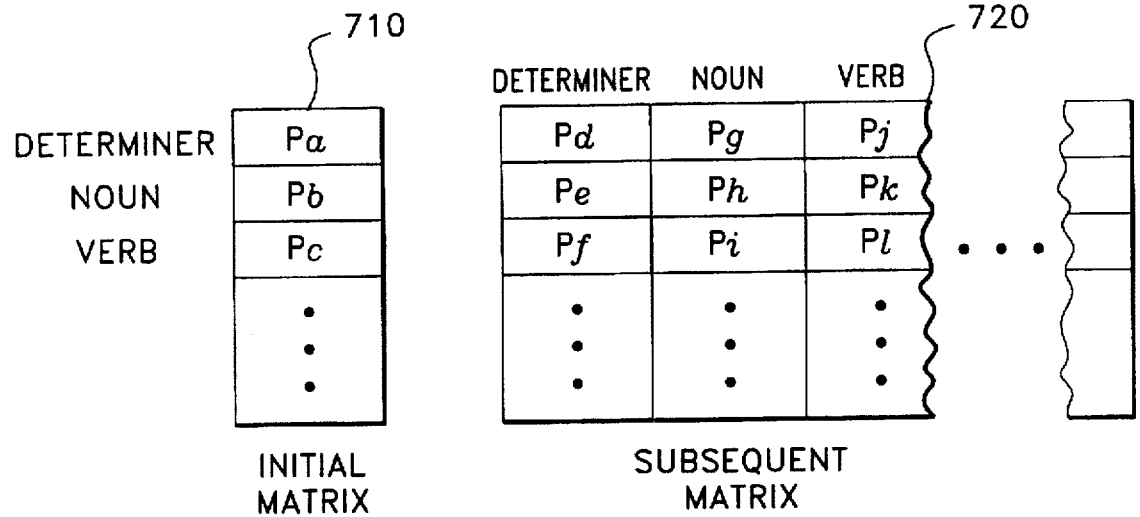
FIG. 7A is a block diagram of a hidden Markov model suitable for parsing full sentences.

Referring now to FIG. 7a, there is shown a diagram illustrating hidden Markov model 700. The hidden Markov model 700 is a conventional hidden Markov model used for determining parts of speech of words in natural language queries in the form of complete sentences. The hidden Markov model 700 includes an initial transition matrix 710 and a subsequent transition matrix 720. The initial transition matrix 710, sometimes referred to as a Pi matrix, contains a plurality of different probabilities $p_a$, $p_b$, $p_c$ that indicate the likelihood that the first word of a query is a selected part of speech as indicated on the vertical edge of the initial transition matrix 710. For example, the probability that the first word of the query is a determiner is $p_a$, and the probability that the first word of the query is a noun is $p_b$. The probabilities of the Pi matrix are obtained by counting the occurrences of each part of speech at the beginning of the sentences of a sample set of text documents, wherein the part of speech tagging can be performed by a human. The subsequent transition matrix 720 includes a probability that indicates the likelihood that the next word of a query will be a particular part of speech given that the current word has a known part of speech. These probabilities are also obtained by counting the occurrences of the various parts of speech in a sample set of text documents which are tagged by a human. The use of hidden Markov models for the purpose of parsing complete sentences is well known to those skilled in the art of parsing natural language.

Figure 7B:
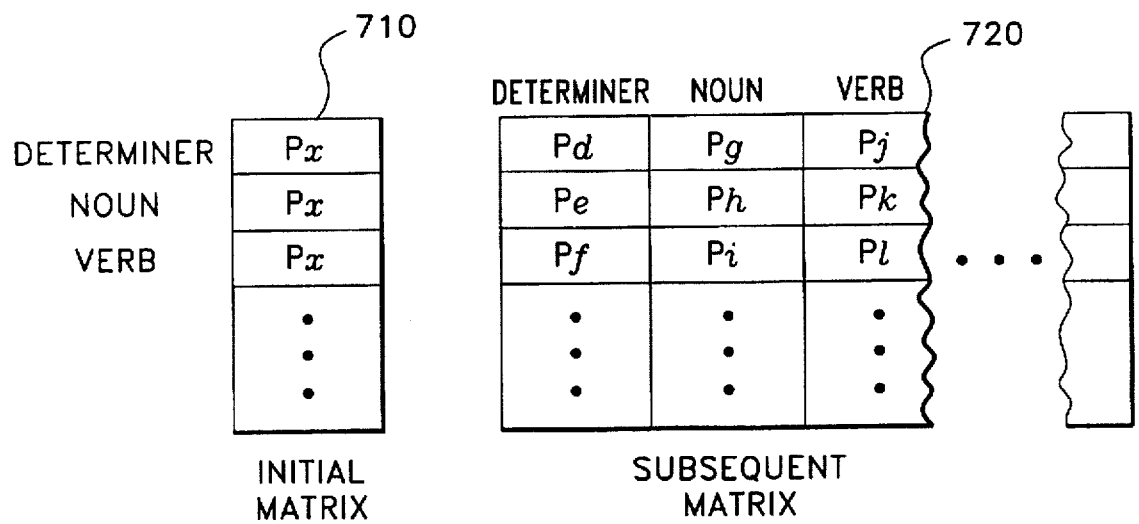
FIG. 7B is a block diagram of a hidden Markov model for parsing sentence fragments, in accordance with a preferred embodiment of the present invention.

Referring now to FIG. 7b, there is shown a modified hidden Markov model 750 used for determining parts of speech in natural language queries formed from sentence fragments, in accordance with a preferred embodiment of the present invention. In the modified hidden Markov model 750, all of the probabilities in the initial transition matrix 710 are made equal to each other. The probabilities in the subsequent transition matrix 720 are unchanged. When determining the part of speech of a word in a query using the modified hidden Markov model 750, the modified Markov model 750 is applied to the words in the same manner as the hidden Markov model 700 is applied. The use of the modified hidden Markov model in this manner provides better parsing results, and therefore better searching results, when the query applied to the search engine is a sentence fragment rather than a full sentence. In the preferred embodiment of the hidden Markov model 750, the value $p_x$ is preferably set at 1/n where n is number of rows in the initial transition matrix 710.

Relevance Normalization

Referring now to FIGS. 8A and 8B, there are shown the relevance normalization table 800 and the relevance normalization curve 850 for normalizing the relevance scores output in step 142j by file Conquest™ searching software. As previously described, when a search results list is returned to the user station 102, each document listed on the search results list is provided with its own relevance score. The relevance score is an indication of how relevant the document is in accordance with the words in the query. For a given document identified during a query search, the relevance score is determined according to, for example, the proximity of query search words located in either the image-text information field 460 or text-type information field 470 associated with the document.

It has been observed that the relevance scores determined by the Conquest™ searching software in step 142j are influenced by the number of words in the query. If the query is short, the relevance scores returned are likely to be higher because it is easier for documents to contain all of the words of the query within a fixed size search window. If the query is long, it is less likely that a document will have all the words of the query within the fixed size search window, and when the probability of including all of the query words within the fixed size search window decreases, the computed relevance of the document decreases. Thus, in accordance with the method of the present invention, the relevance scores output by the Conquest™ searching software in step 142j are normalized to make the relevance scores independent of query length.

The graphical representation 800 is composed of a amber of range fields such as range fields 804a, b, c. The values within the range fields of the curve 800 correspond to the number of words in a query that were found outside a search window used to search the documents represented in the database 117. For a give document, as the amber of words in the query falling outside the search window decreases, the relevance score assigned by the Conquest™ searching software to the document increases. For example, if none of the words are outside the search window, the document receives a high relevance score as indicated by the occurrence of range fields 804a containing zeros on the left hand side of the graphical representation 800. If one of the words in the query fails outside the search window the relevance decreases as shown by the occurrence of range fields 804b occurring in graphical representation 800 to the right of range fields 804 containing zeros.

In relevance normalization table 800, the amber of words in a query, ranging from one to ten, is shown on the vertical edge. Each division along the horizontal edge of the table 800 corresponds to a window segment n. Each window segment n has a range of relevance scores returned by the searching software wherein n is the amber of query words outside the search window. The window segments range from ws0 to ws9 along the horizontal axis of the table 800. The relevance scores of the relevance normalization table 800 are then curved to span the various relevance score ranges shown in table 800. These ranges are ranges defined by the numbers along the rows of table 850 within the window segments n. The curving of the scores is performed in order to make the normalization provided to the user station 102 independent of query length in accordance with the graphical representation 850 wherein the relevance normalization curve 850 is merely a graphical mapping of the scores of the relevance normalization table 800.

For example, consider the case where a query has a length of five words and a returned document has a relevance between 49 and 59. In this example, assume two query words are outside the search window. This example corresponds to row 5 of graphical representation 850. In row 5 of graphical representation 850, a string formed of the number 2, representing the two query words outside the window segment, spans the range of relevance values between approximately 49 and 59. Referring to the relevance normalization table 800, it can be seen that on row 5 the relevance scores below ws2 corresponding to window segment 2 are 79 and 75. This indicates that returned relevance values between 49 and 59 are mapped into relevance scores in the range of 75 to 79 under these circumstances when relevance score normalization is performed. The mapped values in the range of 75 to 79 are the ones provided to the user station 102.

Input File Preparation and Loading

Figure 9:
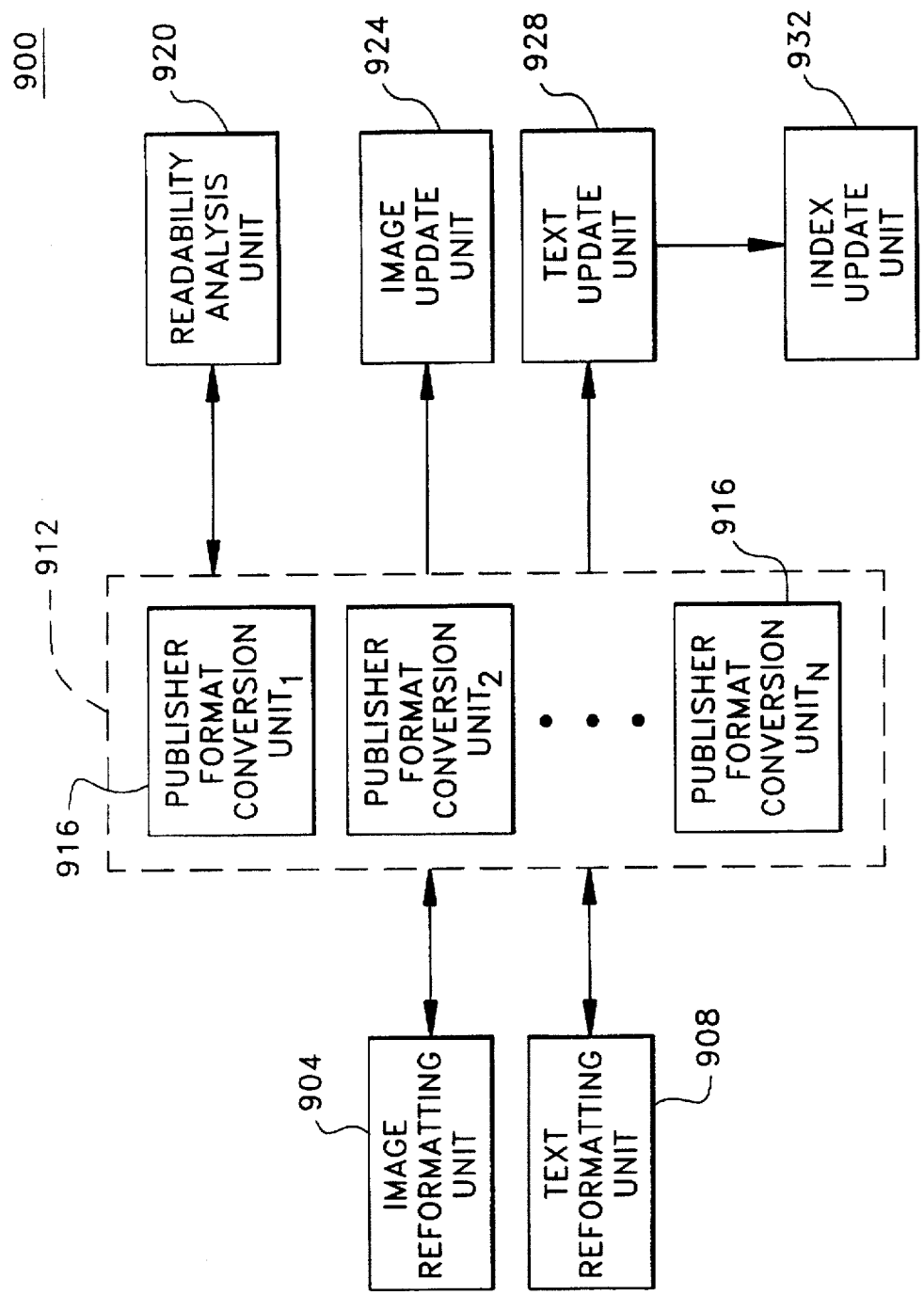
FIG. 9 is a block diagram representation of the data preparation component of the information retrieval system of FIG. 3, in accordance with a preferred embodiment of the present invention.
Figure 9A:
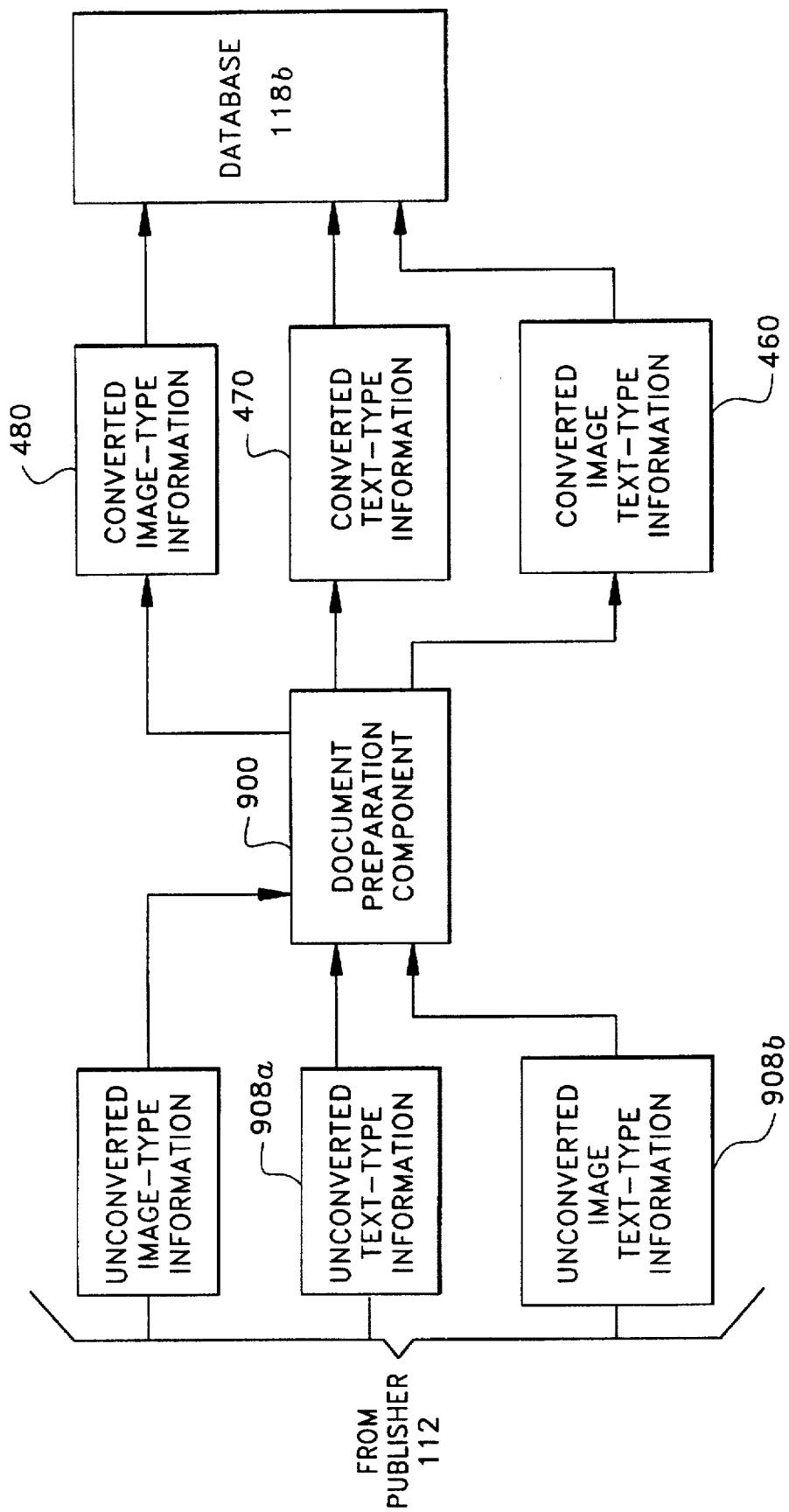
FIG. 9A is a block diagram representation of data flows within the data preparation component of FIG. 9, in accordance with a preferred embodiment of the present invention.

Referring now to FIGS. 9 and 9A, there is shown a data preparation component 900 of the information retrieval system 100 of the present invention and a block diagram 980 of data flows within the data preparation component 900. The operation of data preparation component 900 is preferably performed within document preparation/accounting block 126 of data center 110. The data preparation component 900 receives information representative of documents from a plurality of publishers or document sources 112 such as, for example, image-type information 480. The document information received from the sources 112 is converted from the input format of the publisher 112 into the universal publisher processing format within the data preparation component 900. When the document information is converted into the universal publisher processing format, the data preparation component 900 stores the converted document information in the image/text database 118 for retrieval in response to a query from a user station 102.

The publisher format conversion block 912 of the data preparation component 900 includes N publisher format conversion units 916. The publisher format conversion units 916 of the format conversion block 912 control the parsing and conversion of the input document information from the various publisher-specific formats into the universal publisher processing format supported by the information retrieval system 100. The publisher format conversion block 912 therefore contains one publisher format conversion unit 916 for each of the N different publishers 112 in order to perform the conversion of the information provided by the publishers 112.

Additional publisher format conversion units 916 can be added to the publisher format conversion block 912 as new publishers 112 are added to the list of publishers 112 that provide input information for storage and searching by the information retrieval system 100. Thus, the data preparation component 900 has a modularity that permits it to be easily modified to support any number of new publishers 112 as they are added to the information retrieval system 100.

The input to the N different publisher format conversion units 916 of the publisher format conversion block 912 is the raw data provided by the individual publishers 112 to data center 110. The output of the publisher format conversion units 916 is a converted document suitable for processing, searching and retrieval within the information retrieval system 100. The publisher format conversion units 916 also provide a document information data structure in response to each input document. A unique document identification number is also provided for each input document.

The document information data structure is a data structure containing the document information obtained from the publisher 112, parsed by the format conversion units 916 and made available within data center 110. The elements included in the document information data structure provided by the publisher format conversion units 916 are based upon the processing and retrieval requirements of the information retrieval system 100 and the individual varying publisher formats that are received for conversion. The list of data structure elements is therefore not intended to be exhaustive. Additionally, the data structure element list can change as more publishers 112 and more publisher formats are added to the information retrieval system 100. Not all elements in the document data structure are applicable to every document.

The document information data structure provided by a publisher format conversion unit 916 can include, for example, in the case of a novel, such elements as a name of the author of the novel, a parent title, such as the title of the novel, and child titles, for example, the titles of the chapters within the novel. There can be data structure elements for the Dewey decimal call number and the Library of Congress call number of the novel. There can also be a data structure element for the volume number of the novel if there are multiple volumes. Additionally, there can be data structure elements for the date of publication and the place of publication of the novel, as well as for the ISSN and ISBN. The document information data structure can also include elements for indicating the number of charts or the number of diagram, set forth within the novel. Copyright information can also be available in the document information data structure if the novel has been copyrighted. There can also be a data structure element to indicate the number of pages in the novel, the size of the novel, and so on. It will be understood by those skilled in the art that any number of elements such as these can be present in the document information data structure.

As documents are received for conversion by the publisher format conversion units 916, they can be saved in temporary storage in order to increase document conversion throughput. The temporary storage of input documents lined up for reformatting by the document preparation component 900 is often best performed on a hard disk drive (not shown) because hard disk drives usually have a higher data transfer rate than the type of peripherals from which the input documents are commonly received from the publishers 112, such as CD-ROM, DAP, tape drives and floppy diskettes.

Each of the publisher format conversion units 916 transmits document information to the image reformatting unit 904 and the text reformatting unit 908 within the document preparation component 900. The image reformatting unit 904 is responsible for converting graphics and video such as image-type information 480 in supported publisher image formats into the image format supported by the information retrieval system 100 of the present invention, and providing the converted graphics and video as image-type information 480. The image format supported by the information retrieval system 100 can be any conventional image format. For example, the image format supported by the information retrieval system 100 can be the conventional JPEG file interchange format as described below. The image reformatting unit 904 includes image conversion routines that perform the operations required to reformat the graphical or video input image information received from the publisher format conversion units 916 of the publishers 112. The image conversion routines of the image reformatting unit 904 can be obtained from public domain software packages. For example, the image conversion routines can include, for example, PBM Plus. The PBM Plus image conversion routine is an extended portable bit map tool kit known to those skilled in the art.

The output of the publisher format conversion units 916 of the data preparation component 900 can have different formats depending on whether the data type of the document is image-type information or text-type information. Converted image-type information 480 from the format conversion units 916 can be stored in one or more different formats in data center 110, including, for example, any of the conventional JPEG image file interchange formats known to those skilled in the art of information processing. The conventional JPEG image format includes a standard image compression mechanism developed by the Joint Photograph Experts Group. The JPEG standard does not require any particular file format. The JPEG file interface format used in the information retrieval system 100 is a file format that permits JPEG files to be exchanged with the PC, MAC and UNIX workstation platforms. The JPEG file interface format of the information retrieval system 100 can conform to the JPEG Draft International Standard (ISO DIS 109 18-1). The standard mechanism of the JPEG standard typically compresses image data with a compression ratio between 10:1 and 20:1 without visible loss of image quality. Compression ratios between 30:1 and 50:1 are also possible with small to moderate loss of image quality using the JPEG standard. The JPEG standard is used for graphic data as well as image data within the data retrieval system 100.

The image reformatting unit 904 invoked when a publisher format conversion unit 916 within the publisher format conversion block 912 is provided with an image format converter function. The image format converter function serves as a gateway to the image reformatting unit 904. The format converter function gateway is responsible for routing unconverted images and graphics to the image reformatting unit 904 and for routing converted images and graphics from the image reformatting unit 904.

When a format converter function gateway applies an unconverted input image to the image reformatting unit 904, the image reformatting unit 904 receives a file pointer. The file pointer points to a file containing the input image to be converted. The image reformatting unit 904 also receives the offset within the file to the image that is to be converted. In response, the image reformatting unit 904 returns a converted image 480 to the appropriate publisher format conversion unit 916. The returned converted image 480 is suitable for storage in database 118.

The publisher format conversion units 916 of the publisher format conversion block 912 also communicate with the text reformatting unit 908 within the data preparation component 900. The text reformatting unit 908 converts supported publisher text formats into the text format supported by the information retrieval system 100. The text format supported by the system 100 can be any conventional text format. For example, the text reformatting unit 908 can support ASCII text format. Additionally, the text reformatting unit 908 can provide support for tables and charts using ACSII characters. Conventional public domain text conversion routines can be used to perform the text reformatting operations of the text reformatting unit 908 of the data preparation component 900. Additionally, the text reformatting unit 908 can include program blocks designed to receive input information in proprietary publisher data formats and convert the input information tom the proprietary formats to the supported format.

The text reformatting unit 908 receives a file pointer from a publisher format conversion unit 916 within the publisher format conversion block 912. The pointer received by the text reformatting unit 908 points to the input file containing the text to be reformatted by the text reformatting unit 908. Additionally, the publisher format conversion unit 916 applies an offset for use by the text reformatting unit 908 in performing the text reformatting operations. The offset indicates the location within the file at which the text that is to be reformatted by the text reformatting unit 908 resides. When the input text is reformatted, the text reformatting unit 908 returns the reformatted text to the appropriate publisher format conversion unit 916.

The publisher format conversion units 916 within the publisher format conversion block 912 are also coupled to a text update unit 928. The text update unit 928 stores converted text information in image/text database 118 in text-type information fields 460 and image text-type information fields 470. Each document or image can be stored in a subject category within the image/text database 118 in the preferred embodiment of the information retrieval system 100. The text update unit 928 receives a pointer to the document information data structure of the text (i.e., the image text-type information field 460 or text-type information field 470), and the name of a file (stored in field 417 of record 400) that contains the information that the information retrieval system 100 requires for indexing the document. Text update unit 928 uses this and other information to build a record 400 for each text document processed by the unit.

The text update unit 928 temporarily stores documents as the documents are received. It begins queuing the information that is necessary to index the documents that are added to the system 100. When all documents for a data preparation session are added to the information retrieval system 100, the text update unit 928 invokes the index update unit 932 and passes to the index update unit 932 the necessary information to add the documents to the image/text database 118.

The image update unit 924 also receives information from the publisher format conversion units 916 of the publisher format conversion block 912 within the data preparation component 900. The image update unit 924 stores a converted image document received by the publisher format conversion unit 916 from the image reformatting unit 904 in an image-type information field 480 in the image/text database 118. In the preferred embodiment of the information retrieval system 100, the image can be stored in subject category. The image update unit 924 receives a pointer (stored in fields 432, 433 of a record 430) corresponding the document information structure output by the publisher format conversion units 916. The image update unit 924 temporarily stores documents as they are received from the conversion units 916.

Thus, as previously described, the information retrieval system 100 can receive both (1) unconverted text-type information 908a representative of text, and (2) image-type information 480 representative of images. The information retrieval system 100 can also store both types of information in the image/text database 118. In addition to image-type information 480 and conventional text-type information 908a, the information retrieval system 100 also receives unconverted image text-type information 908b. Image text-type information 908b is text information that is associated with a specific item of image-type information 480. For example, the image text-type information 908b associated with an item of image-type information 480 can be a human readable caption associated with the image or a string of words associated with an image for the purpose of computer searching. Additionally, some image-type information 480 can be received by the information retrieval system 100 without any associated image text-type information 908b and associated image text-type information 908b can be generated at data center 110 for association with the image-type information 480 prior to storage of image-text type information field 460 and the image type information field 480 in the image/text database 118.

Thus, in accordance with the method of the present invention, the image-type information 480 received is stored in the correct image format by the image update unit 924. Additionally, both the text-type information 470 and the image text-type information 460 associated with the image-type information 480 are stored by the text update unit 928 in the image/text database 118. The text-type information 470 and the image text-type information 460 are stored in the image/text database 118 in the same text information format after conversion by the data preparation component 900. Because they are stored in a common text information format, the image text-type information 460 associated with the image and the text-type information 470 not associated with an image are not distinguishable from each other in database searches, and they can be searched by the information retrieval system 100 at the same time in response to a single query. Images located using image text information in this manner can be referred to as dependent images.

When image text-type information 460 is located by a search within the information retrieval system 100, the image-type information 480 associated with the located image text-type information 460 can be retrieved and provided to the user station 102 in accordance with the located image text-type information 460. If the user station 102 has windows software, the image and the text can be displayed in a multiple window 347, 348 or copied into a single window 348a. The image text-type information 460 associated with the image-type information 480 that is used in the search process to locate an image is not necessarily displayed on the user station 102.

It will be understood by the those skilled in the art that a similar storage and retrieval method can be provided for audio-type information. The audio-type information can be digitally stored in a system 100 database in a conventional audio information format. The audio-type information can also be provided with associated audio text information. The audio text information can be stored by the text update unit 928 in the same manner as previously described with respect to the image text information. Thus, text-type information not associated with either image information or audio information, the image text information associated with image information, and the audio text information associated with audio information are all stored in a single common information format in the image/text database 118. Additionally, they are all searched simultaneously within the information retrieval system 100 in response to a single query from the user station 102. When the audio text information is identified by a search, the associated audio information associated with it can be selected can be retrieved.

The publisher format conversion units 916 are also coupled to a readability analysis unit 920. The readability analysis unit 920 produces an index of readability for documents processed by the data preparation component 900. The readability analysis unit 920 can also provide a value corresponding to the scholastic grade level of an input document from a publisher 112. Once calculated by the data preparation component 900, the readability index is stored permanently as an attribute of the document in field 410 of a record 400. For documents that are updated regularly, for example, newspapers, the readability index is assumed to be the same for all issues. Thus, once calculated by the readability analysis unit 920 for a single issue or volume, the readability index value is promulgated to all subsequent issues of the document.

In the prior art, for example, in the Fleish-Kincaid method, it is known to base the readability index upon parameters such as average word syllable length or average sentence length in a document. However, these prior art methods require significant amounts of look-up tables or parsing. Therefore, in the system of the present invention, the readability index is preferably determined based upon the rate at which new terms are introduced to the text as well as by the distribution of words found in the documents compared to distributions of categorized text.

An index update unit 932 is also coupled to the publisher format conversion block 912 of the data preparation component 900. The index update unit 932 updates the document indexes within the document index 117 when a new document or group of documents is added to the data center 110. Additionally, the index update unit 932 updates the document index database 117 when documents are purged from the data center 110. The index update unit 932 updates the document information directory table. When purging documents from the data center 110, the index update unit 932 deletes the document text or image from the document information directory and/or dependent image tables in database 118, and marks the document as deleted in the index system.

Automobile Document Subjecting System

Documents stored in the image/text database 118 are divided into a number of different subject categories. The user of the information retrieval system 100 is permitted to specify a subject or subjects for search in response to a user query. For example, the user may wish to search only sports literature or only art literature in the image/text database 118. This avoids searching through documents in the database 118 that are unlikely to be of interest to the user. In order to provide this capability to the user station 102, the input documents applied to the information retrieval system 100 must be categorized or subjected after they arrive from the publishers 112. Categorizing of input documents can be a very laborious and time consuming process when performed by a human viewer because a very large number of incoming documents can be added regularly to the data center 110. Additionally, determinations can be made for each input document whether it should be categorized in more than one subject category.

Figure 10:
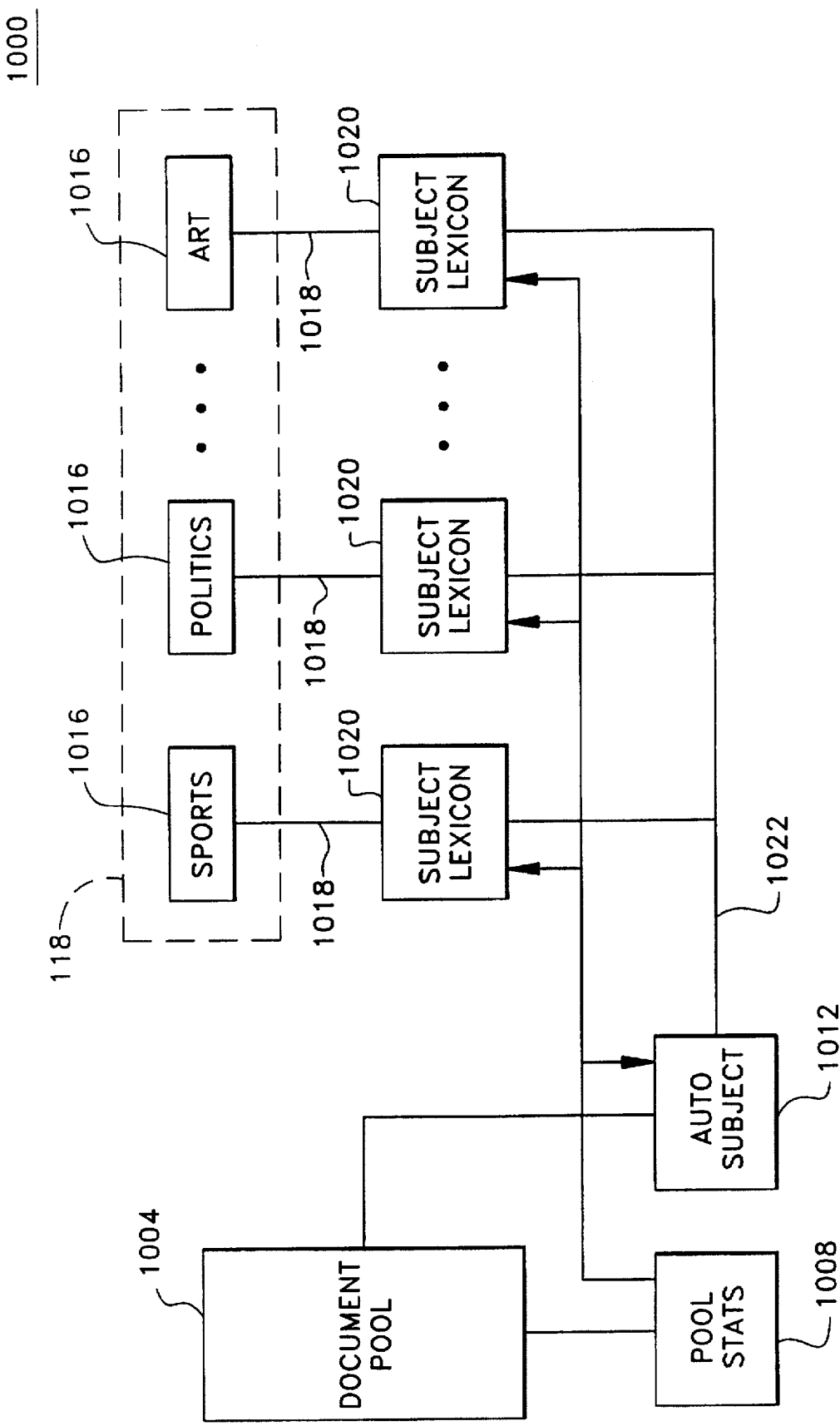
FIG. 10 is a block diagram representation of an automatic subjecting system for automatically determining the subject category of input documents, in accordance with a preferred embodiment of the present invention.

Referring now to FIG. 10, there is shown an automatic docket subjecting system 1000. The automatic document subjecting system 1000 receives documents processed by the data preparation component 900 and stored in a document pool 1004. The automatic document subjecting system 1000 automatically determines the subject category of the received documents without any review of the received document by a human viewer. It will be understood that the automatic document subjecting performed within the data center 110 thus eliminates the need for the laborious and time consuming subjecting operations performed in the prior art wherein humans reviewed the input documents received by an information retrieval system in order to determine the subject categories of each received document for storage in a system database such as the image/text database 118.

The automatic document subjecting system 1000 includes a plurality of individual subject databases 1016 which can reside within the image/text database 118 of the image retrieval system 100. Each subject database 1016 contains documents relevant to a separate subject category. For example, one subject database 1016 can contain only documents relating to the subject of art. Another subject database 1016 can contain only documents relating to the subject of sports. In the preferred embodiment of the invention, there can be any number of different subject categories, each having its own subject database 1016. Subject categories have also been provided, for example, for science, religion, health, education, geography and recipes.

The automatic document subjecting system 1000 also includes an individual subject lexicon 1020 coupled to each subject database 1016. Each subject lexicon 1020 includes a list of classifier words whose occurrence in a document has been determined to be an indicator that the document is likely to be classified in the subject category corresponding to the subject lexicon 1020. The behavior of the classifier words included in the subject lexicons 1020 can be determined according to a statistical analysis described hereinbelow. In addition to the classifier words, the subject lexicon 1020 includes a discriminator weight for each classifier word in the subject lexicon 1020. The discriminator weight, as described in more detail hereinbelow, provides a measure of the difference between the behavior of a classifier word in a subject database 1016 and its behavior in the overall document pool 1004 which contains documents from all subject categories 1016.

The automatic document subjecter system 1000 includes an automatic subjecting block 1012. The automatic subjecting block 1012 performs a comparison of the input documents from the publishers 112, stored in the document pool 1004, with the various subject lexicons 1020 in order to categorize them into their correct subject category. In the autosubjecting process, the words of the input document in the document pool 1004 to be subjected are compared by the automatic subjecter block 1012 with the classifier words of the various subject lexicons 1020 by way of the word comparison line 1022. Based upon this comparison, the input documents stored in the document pool 1004 are stored in selected subject databases 1016 by way of the appropriate subject category line 1018.

In order to determine whether a document stored in the document pool 1004 should be stored in a subject database 1016, a determination is made whether each classifier word in the subject lexicon 1020 of the subject database 1016 occurs in the document. More particularly, for each subject database 1016, a sum of the discriminator weights of each classifier word occurring in the document is determined. Thus, for a given document, several separate sums will be determined, each of which corresponds to the sum of discriminator weights determined for a particular subject database 1016. The magnitude of the sum corresponding to a particular database 1016 represents a confidence score which reflects how strongly the document relates to the subject represented by the particular database 1016. Accordingly, for a given document, there will be a plurality of confidence scores, each of which corresponds to a particular subject database 1016. In a preferred embodiment, the determination as whether to include a document in a subject database 1016 is based on a comparison of the various confidence scores determined for the document. For example, in one embodiment, if a confidence score associated with a particular subject exceeds the confidence score associated with all other subjects by 30% or more, then the document is determined as being associated with the particular subject and is selected for inclusion in the database 1016 associated with the particular subject. It will be understood by those skilled in the art that other thresholds may be used in comparing the various confidence scores to determine whether to select a document for inclusion in a particular subject database 1016.

Figure 11:
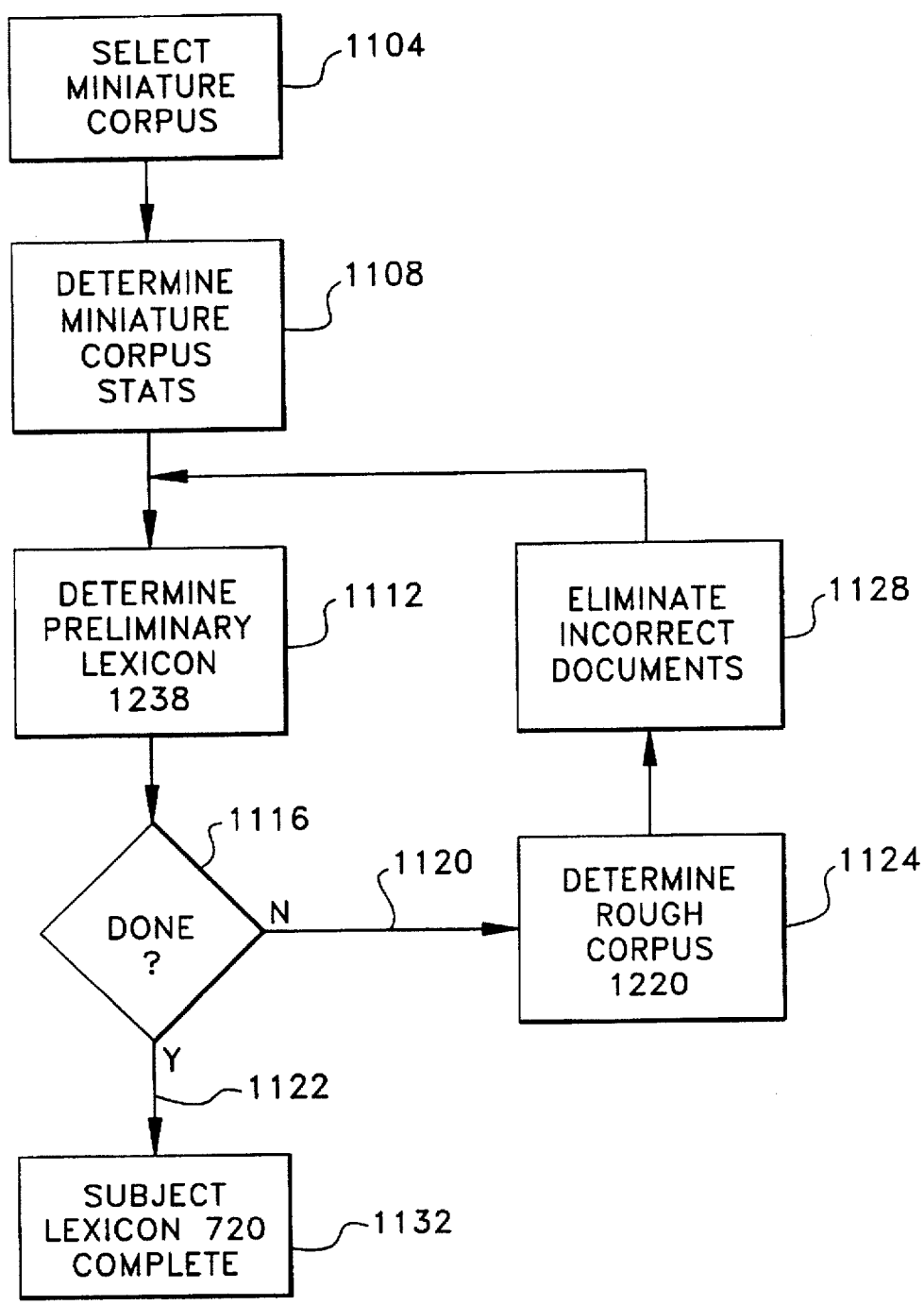
FIG. 11 is a process flow representation of a method for generating subject lexicons for use in the automatic subjecting system of FIG. 10, in accordance with a preferred embodiment of the present invention.
Figure 12:
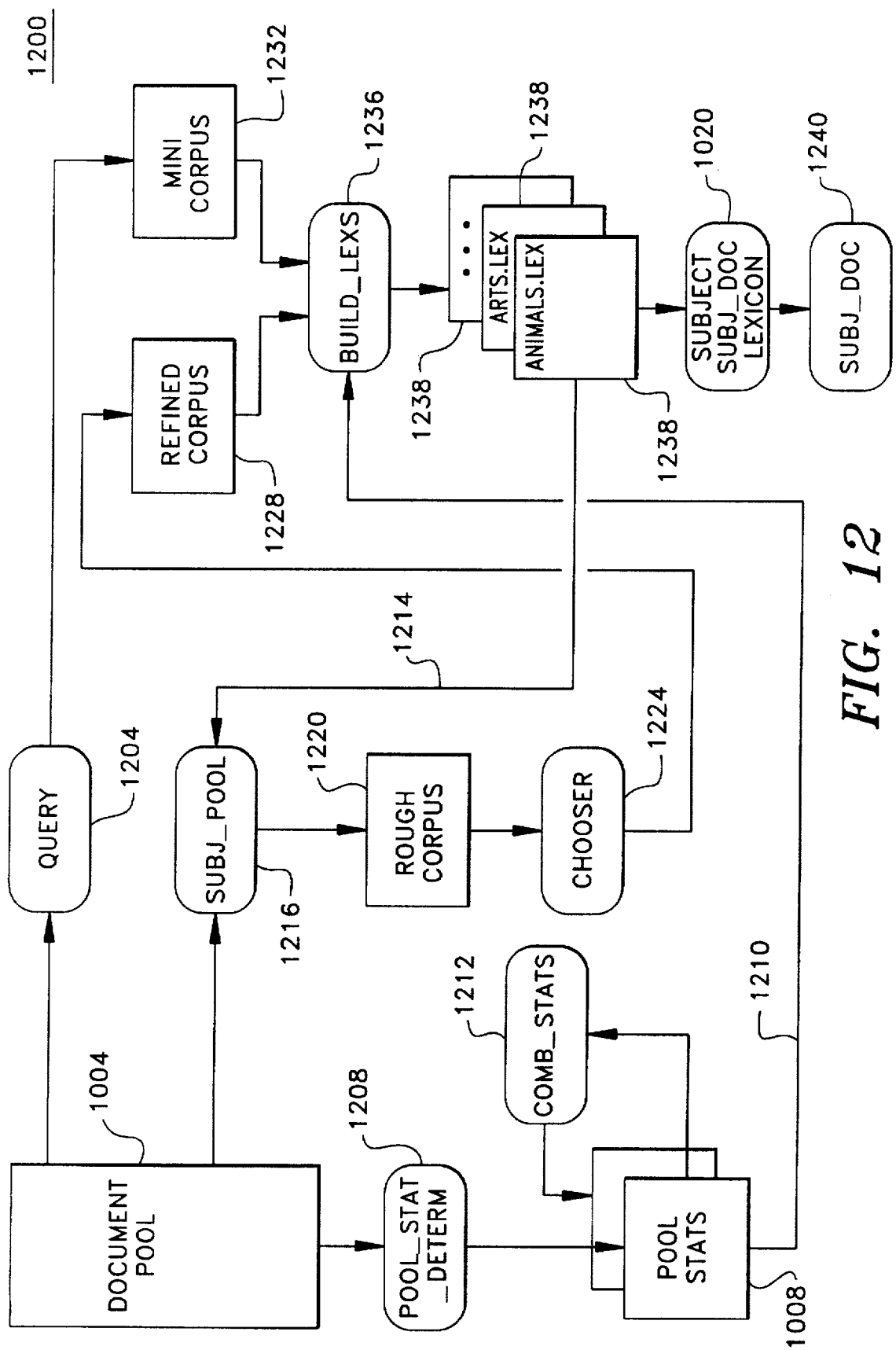
FIG. 12 is a block diagram of a system for generating subject lexicons for use in the automatic subjecting system of FIG. 10, in accordance with a preferred embodiment of the present invention.

Referring now to FIGS. 11 and 12, there are shown the subject lexicon generation process flow 1100 and the subject lexicon generation system 1200 of the present invention. The subject lexicon generation process flow 1100 and the subject lexicon generation system 1200 describe the generation of the subject lexicons 1020 of the automatic document subjecting system 1000 in order to permit the automatic subjecting system 1000 to receive input documents from the publishers 112 stored in the document pool 1004, and automatically determine a subject area category for the received input documents. When a subject area of an input document is determined using a subject lexicon 1020 generated by the subject lexicon generation process flow 1100 and the subject lexicon generation system 1200, the input document can be sorted into a selected subject database 1016 as previously described.

In order to generate a subject lexicon 1020 for a selected subject category, a miniature corpus 1232 including a small number of documents, for example five or ten documents, known to be typical of the subject category is selected by a human viewer as shown in block 1104 of the process flow 1100. This selection can be performed using the query program 1204 to select the small number of subjected documents from the document pool 1004. The documents selected from the document pool 1004 by the query program 1204 thus form the miniature corpus 1232. The miniature corpus 1232 of the selected subject can be referred to as the seed 1232 because a subject lexicon 1020 is developed from it by the system 1200 following the process flow 1100. Statistics on the words in the selected documents of the miniature corpus 1232 are determined as shown in block 1108. The statistics include, for example, the frequency of occurrence of each word in the miniature corpus, and the number of documents in the miniature corpus in which each such word appears. The generation of these statistics is performed by the build_lexs program 1236. As shown in block 1112, a preliminary lexicon 1238 is developed by determining the words most likely to appear in the documents of the miniature corpus 1232 based upon the statistics determined by the build_lexs program 1236. The build_lexs program 1236 can build a preliminary lexicon 1238 for each subject category database 1016 in this manner. The build_lexs program 1236 then compares the behavior of the words in the miniature corpus 1232 of the selected subject area, as determined in block 1108, with the behavior of the same words in the overall document pool 1004. In order to permit this comparison, the pool_stats_determine program 1208 determines the statistics of the words in the document pool 1004. The statistics determined by the pool_stats_determine program 1208 include the frequency of occurrence of the words and the number of documents in which each word appears. These statistics are stored in pool statistics 1008. Since these statistics are required on a very large number of different words, it may be convenient to perform the tasks in segments and combine the results using the comb_stats program 1212. These statistics in pool_stats 1008 are applied to the build_lexs program 1236 by way of the line 1210.

A discriminator weight is determined by the build_lexs program 1236 for each classifier word (or unigram) in the subject lexicon 1020. The discriminator weight of a word is equal to log ($P_{W_{mc}}/P_{W_c}$), where $P_{W_{mc}}$ is the probability of the word in the miniature corpus 1232, and $P_{W_c}$ is the probability of the word being in the document pool 1004. The discriminator weights calculated in this manner are stored in the subject lexicon 1020 for each classifier word. In this manner the subject lexicon generation system 1100 and the subject lexicon generation system 1200 determine classifier words of the various subject lexicons 1020. Additionally, a discriminator weight can be determined for "bigrams" that can act as classifier words in the manner described above with respect to unigram. Bigrams are word pairs that occur together in documents and can therefore provide useful information about the subject area of the subject database 1016. The discriminator weights for bigrams are calculated using the mutual information formula set forth in equation (1) below:

$$MI(a,b) = \log(P(ab)/P(a)V(b)) \quad (1)$$

where P(a) is the probability that word a of a bigram occurs in the document pool 1004, P(b) is the probability that word b of the bigram appears in the document, and P(ab) is the probability that words a and b of the bigram appear next to each other in a document of the subject miniature corpus. If word a and word b are statistically independent, then MI(a, b)=0. Alternatively, if word a and word b are statistically related, then MI(a,b)>0.

A determination is made at step 1116 whether the construction of the subject lexicon 1020 is complete. On the first pass through the subject lexicon generation process flow 1100, path 1120 is followed. The preliminary lexicon 1238 of the selected subject area is then applied to the subj_pool program 1216 by way of line 1214. As shown in block 1124 of the subject lexicon generation process flow 1100 a rough corpus 1220 of documents is selected from the documents in the document pool 1004 by the subj_pool program 1216. The documents selected by the subj_pool program 1216 are the documents in the document pool 1004 that have the highest confidence of being in the selected subject area, as determined using the classifier words and confidence levels of the preliminary lexicon 1238 built by the build_lexs program 1236 in the manner described with respect to auto-subjector 1012. The confidence threshold used by the subj_pool program is preferably the same as that described above for auto-subjector 10 12. Thus, if a confidence score associated with a particular subject exceeds the confidence score associated with all other subjects by 30% or more, then the document is determined as being associated with the particular subject by the subj_pool program. In the preferred embodiment of the subject lexicon generation system 1200, the subj_pool program 1216 is provided with adjustable confidence criteria. The rough corpus 1220 can include, for example, two-hundred documents from the document pool 1004. A human reviewer then manually reviews the documents selected by the subj_pool program 1216 for inclusion in the rough corpus 1220. The human reviewer can use the chooser program 1224 for this review process. The human reviewer eliminates documents selected for inclusion in the rough corpus 1220 using the preliminary lexicon 1238 if the human viewer determines that the reviewed document does not belong in the selected subject. This purging operation for removing documents incorrectly selected using the preliminary lexicon 1238 is set forth in block 1128 of the subject lexicon generator process flow 1100. Removal of the incorrectly included documents of the rough corpus 1220 provides the refined corpus 1228.

The refined corpus 1228 is then operated upon by the build_lexs program 1236 in the manner described previously with respect to the operation of the build_lexs program 1236 upon the miniature corpus 1232. In accordance with the refined corpus 1228, the build_lexs program 1236 can produce a new preliminary lexicon 1238. The new preliminary lexicon 1238 can be used as a subject lexicon 1020 in the automatic document subjecting system 1000 if a determination is made in step 1116 that lexicon generation is complete and path 1122 followed. Alternately, path 1120 can be repeated and the new preliminary lexicon 1238 can be operated upon by the subj_pool program 1216 to provide a new rough corpus 1228. The Bop through the subject lexicon generation system 1200 including the path 1120 can be repeated in this manner any number of times. It is believed that the optimum number of repetitions in this manner is two or three. It is also believed that the use of bigrams for selecting documents is most useful in the first pass through path 1120.

Royalty Database Management

Figure 13:
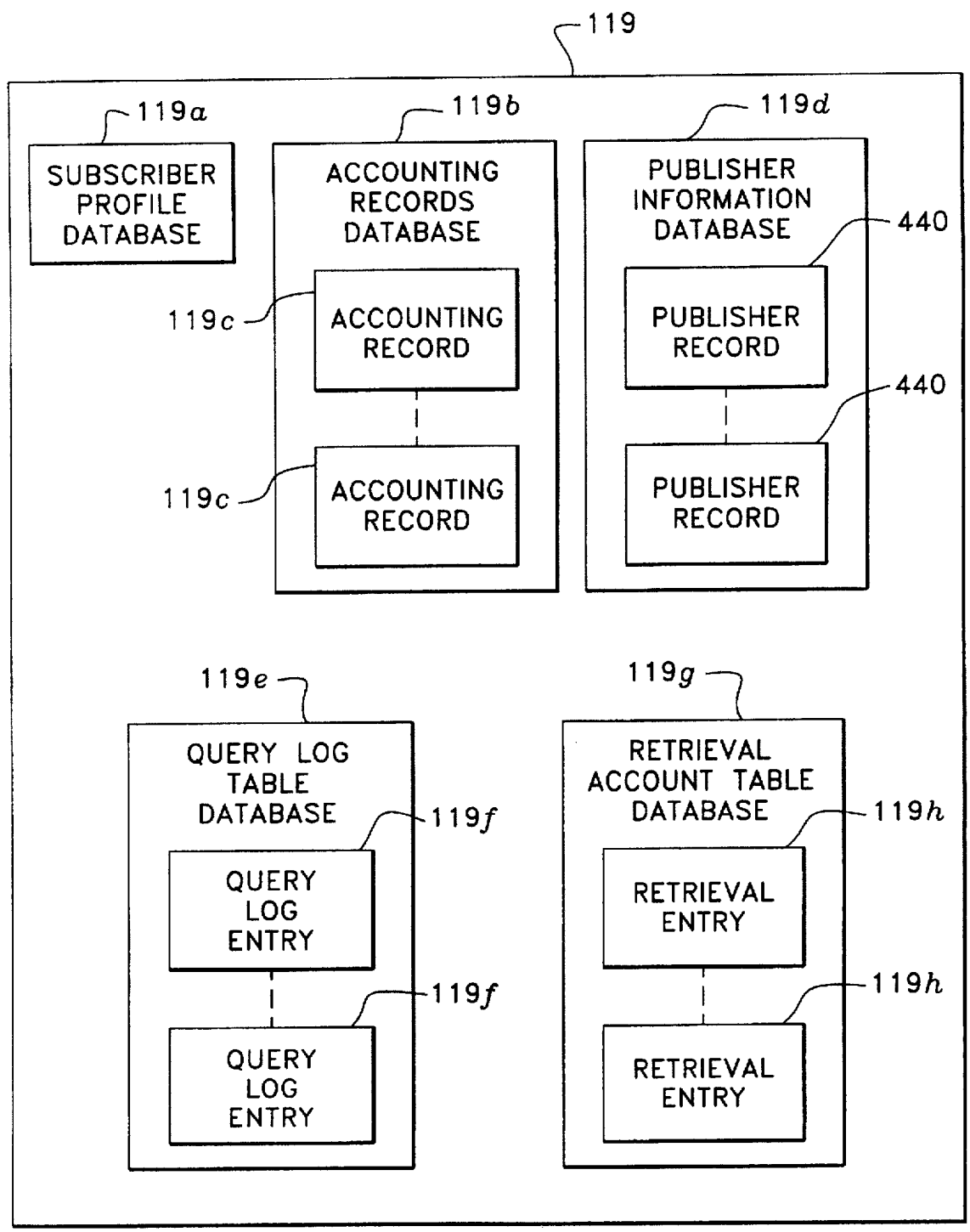
FIG. 13 is a representation of data structures within an accounting database, in accordance with a preferred embodiment of the present invention.

In order to perform royalty and marketing information management within the information retrieval system 100, the accounting manager 138 of the data center 110 provides generalized reporting capabilities with respect to a wide range of accounting database information within the accounting database 119 (shown in FIG. 13). The accounting database information within the accounting database 119 is organized, for example, into databases 119a, b, d, e, and g, as described below, in order to facilitate report generating and management functions at the data center 110. For example, the accounting database 119 of the data center 110 includes a subscriber profile database 119a for storing subscriber profile information. The subscriber profile information in the subscriber profile database 119a can include a subscriber identification, a subscriber name, address, telephone number, date of birth, and gender. The subscriber profile information can also include the number of siblings of the subscriber, by gender, the occupation of the mother and father of the subscriber, and any foreign language spoken by the subscriber. Additionally, the subscriber profile information can include the favorite subjects in school, the hobbies, the extracurricular activities and the favorite magazines of the subscriber. The college attendance plans and possible future profession of the subscriber can also be included in the subscriber profile information stored in the database 119a. The subscriber profile information in the subscriber profile database 119a can also include the configuration of the computer used by the subscriber.

The accounting database 119 also includes an accounting records database 119b containing a plurality of accounting records 119c. The accounting record 119c within the accounting database 119b can contain a document identification, a publisher identification and a subscriber identification. Additionally, the accounting record 119c contains a time stamp indicating the time of access of the document by a user station 102 and a link to the subscriber profile information in the subscriber profile database 119a. The accounting records 119c permit the performance of accounting and marketing functions within the data center 110. One accounting record 119c is stored within the accounting records database 119b for each document that is received by a user station 102 in response to a query. Multiple retrievals of the same document in response to a single query by the user station 102 result in a single accounting record 119c within the accounting records database 119b. Multiple retrievals of a document in response to different queries result in the addition of multiple accounting records 119c to the accounting records database 119b. An accounting record 119c for a document can be added to the accounting records database 119b within the account database 119 at the time the retrieved document is transferred to the user station 102.

Additionally, accounting database 119 includes a publisher information database 119d for storing publisher database information. The publisher information database 119d includes a publisher information record 440, as previously described, for storing information on each publisher 112 that provides documents to the information retrieval system 100. The information stored for a publisher 112 in a publisher information record 440 can include fields such as a publisher identification field 441, a name field 442, and address fields 443, 444, a contact name field 449, a contact title, telephone number field 451 and address field 450 associated with the publisher 112 can also be stored in the publisher information record 440. Additionally, the publisher database information record 440 can contain the royalty percentage and the royalty amount by month of the publisher 112. Each time a new publisher 112 is added to the information retrieval system 100, a new publisher information record 440 is added to the publisher information database 119d.

Using the information in the subscriber profile database 119a, the accounting records 119c within the accounting records database 119b and the publisher information records 440 within the publisher information database 119d of the accounting database 119, the accounting manager 138 can perform various royalty, marketing and auditing operations. Using this information, data center 110 can provide reports on document usage, reports on queries that result in no hits or in low relevance hits, reports on the categories of users and reports on the demographics of the various users. The data center 110 can also provide time profiles such as time profiles per session, time profiles per week and time profiles on the think time required by the users. It is also possible for the accounting manager 138 of the information retrieval system 100 to determine and report what queries are submitted by user stations 102, a list of documents returned to each user station 102 in response to each query submitted, and the relevance of each document returned for the queries. The document retrieval and the user feedback information can also be determined and reported by the accounting manager 138.

The royalty payment computations of royalty database information management require a generalized reporting capability of the accounting database 119. For example, the accounting records 119c within the accounting records database 119b can be summarized and sorted according to a number of different criteria. The criteria include for example, publisher 119, document identification number, date and frequency of access.

A query log table database 119e within the accounting database 119 is used by the data center 110 for maintaining a history of queries made by users. The query log table database 119e contains a query log entry 119f for each query applied to the information retrieval system 100 by a user station 102. Each query log entry 119f identities the raw natural language and fields, if any, entered by the user to perform a query. The query log entry 119f also includes the date and time of the query as well as the number of matches that resulted from the query. In addition, each log entry 119f cross-references the user identification number of the user that entered the query into the information retrieval system 100.

A new query log entry 119f is added to the query log table database 119e each time a new query is received. When the new query is received, all attributes of the query, except the number of documents matching the query, are placed into the query log entry 119. The query attribute indicating the number of documents matching the query is incremented for each document found by the query server 116, provided the document found meets a minimum relevance threshold.

A retrieval account table database 119g is also provided within the accounting database 119 of the data center 110. The retrieval account table database 119g is used by the information retrieval system 100 to log all document retrievals performed in response to queries. When a document retrieval is initiated within the data center 110, a document retrieval entry 119h inserted in the document retrieval account table database 119g and the time and date of the retrieval is recorded in the document retrieval entry 119h. Each document retrieval 119h is a record that stores information identifying the document retrieved by cross-referencing the document information directory table. Each document retrieval entry 119h also identifies the publisher 112 of the document by cross-referencing the publisher information database 119d. The reference to the publisher information database 119d is used to credit the publisher for the retrieval for the purpose of royalty management. Each document retrieval entry 119h also cross-references the query and the user identification number of the user that issued the query for further accounting purposes using the accounting database 119. The attributes of the retrieval account table entries 119h include the document identification number, the publisher identification number, the subscriber identification number, a query identification number and the retrieval time.

In order to start an account reporting session for generating reports using the information in the accounting database 119, the report type must be specified. For example, a publisher retrieval account report can be specified. Additionally, the starting date and the ending date of the report must be specified. These reports include documents that accumulate and present any of the information set forth in any of the data structures and databases set forth.

A plurality of marketing reports can be generated. For example, reports indicating subscriber profile statistics such as the average age of the users or the percentage of users of each gender can be generated. In addition, for each document retrieved by document retrieval system 136, a report indicating the demographical makeup of the users that selected the document for retrieval can be generated. Subscriber computer statistics such as the percentage of subscribers with different kinds of computers and common modem speeds can be provided. Subscriber/query statistics such as the average number of queries per user and the average number of queries per gender can be obtained.

System utilization statistics are also available. For example, retrieval daily peaks and valleys and the average number of retrievals per day can be determined.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A method for performing a search of a database of an information retrieval system in response to a query having at least one query word and selecting information from said database in accordance with said query word, comprising the steps of:

(a) providing a semantic network for determining a query expansion word for expanding said search of said database in response to a selected query word;

(b) determining a part of speech of said selected query word of said query;

(c) applying said selected query word to said semantic network to provide a query expansion word in response to said selected query word;

(d) determining a part of speech of said query expansion word; and (e) applying said query expansion word to said database for selecting information from said database in response to said query expansion word only when said part of speech of said query expansion word is the same as said part of speech of said selected query word.

2. The method for performing a search of a database of claim 1, wherein a hidden Markov model is used for determining said part of speech of said selected query word in step (b).

3. A system for performing a search of a database of an information retrieval system in response to a query having at least one query word and selecting information from said database in accordance with said query word, comprising:

a semantic network for determining a query expansion word for expanding said search of said database in response to a selected query word;

means for determining a part of speech of said selected query word of said query;

said query expansion word obtained by applying said selected query word to said semantic network, said query expansion word having a part of speech; and information selected from said database in response to said query expansion word only when said determined part of speech of said selected query word is the same as said part of speech of said query expansion word.

4. The system for performing a search of a database of claim 3, wherein said means for determining said part of speech of said selected query word is formed from a hidden Markov model.

* * * * *